(12) United States Patent
Brown et al.

(10) Patent No.: US 10,266,444 B2
(45) Date of Patent: Apr. 23, 2019

(54) METHOD OF MAKING MULTILAYER GLASS STRUCTURE

(71) Applicant: Ferro Corporation, Mayfield Heights, OH (US)

(72) Inventors: Terry J. Brown, Pittsburgh, PA (US); George E. Sakoske, Independence, OH (US); Osamu Ishii, Ami-machi (JP)

(73) Assignee: Ferro Corporation, Mayfield Heights, OH (US)

( * ) Notice: Subject to any disclaimer, the term of this patent is extended or adjusted under 35 U.S.C. 154(b) by 428 days.

(21) Appl. No.: 14/647,557

(22) PCT Filed: Dec. 12, 2013

(86) PCT No.: PCT/US2013/074537
§ 371 (c)(1),
(2) Date: May 27, 2015

(87) PCT Pub. No.: WO2014/093568
PCT Pub. Date: Jun. 19, 2014

(65) Prior Publication Data
US 2015/0299025 A1    Oct. 22, 2015

Related U.S. Application Data

(60) Provisional application No. 61/724,434, filed on Dec. 14, 2012.

(51) Int. Cl.
*C03B 23/203* (2006.01)
*C03C 27/00* (2006.01)
(Continued)

(52) U.S. Cl.
CPC .......... *C03B 40/033* (2013.01); *B32B 17/068* (2013.01); *B32B 17/10036* (2013.01); *B32B 17/10348* (2013.01); *B32B 17/10614* (2013.01); *B32B 17/10651* (2013.01); *B32B 17/10889* (2013.01); *C03B 19/06* (2013.01);
(Continued)

(58) Field of Classification Search
CPC .............................. C03B 23/203; C03C 27/00
See application file for complete search history.

(56) References Cited

U.S. PATENT DOCUMENTS 2,286,275 A    6/1942    Hood et al.
3,589,880 A    6/1971    Clark
(Continued)

OTHER PUBLICATIONS

International Search Report for corresponding PCT/US2013/074537 dated May 7, 2014, one page.
(Continued)

*Primary Examiner* — Cynthia Szewczyk
(74) *Attorney, Agent, or Firm* — Rankin, Hill & Clark LLP

(57) ABSTRACT

Methods of making multilayer glass structure are described. The method involves providing first and second glass sheets, and a first enamel composition layer and at least one separation layer between the first and second glass sheets, and firing the glass sheets to sinter the first enamel composition to the first glass sheet. The separation layer is a black pigment separation layer, a refractory material separation layer, or an oxidizer separation layer. The separation layer can improve separation of the first and second glass sheets after the firing.

15 Claims, 14 Drawing Sheets

(51) Int. Cl.
*C03B 40/033* (2006.01)
*C03B 23/023* (2006.01)
*B32B 17/06* (2006.01)
*B32B 17/10* (2006.01)
*C03B 19/06* (2006.01)
*C03C 17/04* (2006.01)
*C03B 23/025* (2006.01)

(52) U.S. Cl.
CPC ............ *C03B 23/023* (2013.01); *C03C 17/04* (2013.01); *B32B 2605/006* (2013.01); *C03B 23/025* (2013.01)

(56) References Cited

U.S. PATENT DOCUMENTS

| | | |
|---|---|---|
| 4,093,771 A | 6/1978 | Goldstein et al. |
| 4,306,012 A | 12/1981 | Scheve |
| 4,415,624 A | 11/1983 | Prabhu et al. |
| 4,596,590 A | 6/1986 | Boaz |
| 4,649,062 A | 3/1987 | Kosiorek et al. |
| 4,684,389 A | 4/1987 | Boaz |
| 4,685,770 A * | 8/1987 | Baeger ................ G02F 1/13392 156/292 |
| 4,770,685 A | 9/1988 | Boaz |
| 4,959,090 A | 9/1990 | Reinherz |
| 4,983,196 A | 1/1991 | Stotka |
| 5,037,783 A | 8/1991 | Boaz |
| 5,149,565 A | 9/1992 | Johnson et al. |
| 5,153,150 A | 10/1992 | Ruderer et al. |
| 5,187,202 A | 2/1993 | Walkowski |
| 5,194,303 A | 3/1993 | Nigrin et al. |
| 5,208,191 A | 5/1993 | Ruderer et al. |
| 5,286,270 A | 2/1994 | Ruderer et al. |
| 5,306,674 A | 4/1994 | Ruderer et al. |
| 5,324,373 A | 6/1994 | Gillner et al. |
| 5,328,753 A | 7/1994 | Boaz |
| 5,332,412 A | 7/1994 | Manabe et al. |
| 5,346,651 A | 9/1994 | Oprosky et al. |
| 5,350,718 A | 9/1994 | Anquetil et al. |
| 5,443,669 A | 8/1995 | Tünker |
| 5,525,280 A * | 6/1996 | Shukla ................ G01L 9/0075 156/233 |
| 5,559,059 A | 9/1996 | Ryan |
| 5,605,591 A * | 2/1997 | Beyrle ............ B32B 17/10036 156/106 |
| 5,616,417 A | 4/1997 | Ryan |
| 5,677,251 A | 10/1997 | Sakoske |
| 5,686,795 A | 11/1997 | Sakoske et al. |
| 5,710,081 A | 1/1998 | Tünker |
| 5,714,420 A | 2/1998 | Sakoske et al. |
| 5,753,685 A | 5/1998 | Sakoske |
| 5,754,005 A | 5/1998 | Sakoske et al. |
| 5,783,507 A | 7/1998 | Sakoske |
| 5,827,789 A | 10/1998 | Tünker et al. |
| 5,900,319 A | 5/1999 | Sakoske |
| 5,925,160 A | 7/1999 | Sakoske |
| 5,939,343 A | 8/1999 | Tünker et al. |
| 5,968,659 A | 10/1999 | Sakoske et al. |
| 6,022,624 A | 2/2000 | Sakoske |
| 6,057,037 A | 5/2000 | Tünker et al. |
| 6,087,282 A | 7/2000 | Panzera et al. |
| 6,105,394 A | 8/2000 | Sridharan et al. |
| 6,171,383 B1 | 1/2001 | Sakoske et al. |
| 6,207,285 B1 | 3/2001 | Sakoske et al. |
| 6,221,147 B1 | 4/2001 | Sakoske et al. |
| 6,238,847 B1 | 5/2001 | Axtell, III et al. |
| 6,255,239 B1 | 7/2001 | Sakoske |
| 6,346,493 B1 | 2/2002 | Kniajer et al. |
| 6,485,838 B1 | 11/2002 | Shimada et al. |
| 6,503,316 B1 | 1/2003 | Sakoske et al. |
| 6,624,104 B2 | 9/2003 | Sakoske et al. |
| 6,680,121 B2 | 1/2004 | Sakoske et al. |
| 6,936,556 B2 | 8/2005 | Sridharan et al. |
| 7,157,025 B2 | 1/2007 | Ichimura et al. |
| 7,832,233 B2 | 11/2010 | Brown et al. |
| 7,955,470 B2 | 6/2011 | Kapp et al. |
| 8,772,189 B2 | 7/2014 | Singh et al. |
| 2003/0012962 A1 | 1/2003 | Beyrle |
| 2006/0154799 A1 | 7/2006 | Rehorek et al. |
| 2006/0260734 A1* | 11/2006 | Brown .............. B32B 17/10036 156/99 |
| 2009/0053534 A1* | 2/2009 | Prunchak .......... B32B 17/10036 428/438 |
| 2014/0013804 A1* | 1/2014 | Ono .................... C03C 23/0025 65/43 |

OTHER PUBLICATIONS

Grant & Hackh's Chemical Dictionary, Fifth Edition, McGraw-Hill Book Company, p. 86.
CRC Handbook of Chemistry and Physics, 66th Edition, 1985-1986, p. B-78.

* cited by examiner

METHOD OF MAKING MULTILAYER GLASS STRUCTURE

TECHNICAL FIELD

The present invention relates to multilayer glass structures, and particularly a method of making multilayer glass structures decorated using crystallizing enamels.

BACKGROUND

Crystallizing glass enamel compositions can be used for a variety of applications such as, for example, decorative coatings for glassware, chinaware, and the like. They are especially useful in forming colored borders around glass sheets used for automotive windshields, sidelights and backlights. The colored borders enhance appearance as well as prevent UV degradation of underlying adhesives. The crystallizing glass enamels are reactive compositions for they contain components that react and crystallize upon firing.

In general, these enamel compositions include mainly a glass frit, a colorant, and an organic vehicle. They are applied to a substrate, for example, a sheet of glass, and subsequently fired to burn off the organic vehicle and fuse the frit thus bonding the enamel coating to the substrate. Glass sheets for automotive use are generally coated with the enamel composition and then subjected to a forming process at elevated temperatures. During this treatment the enamel melts and fuses to the glass substrate and the glass is formed into a desired final shape. Such compositions can also be applied to one layer of a multilayer laminate (such as a safety glass windshield) prior to stacking the layers together, whereby the pigment/color is in the interior of the resulting multilayer laminate.

In such case, after application of the enamel by screen printing, for example, the wet film is dried or cured at low temperatures or with UV light to remove the solvents and produce a dried green enamel where the particles are held together by higher molecular weight organic binder molecules. After producing the green enamel composition layer, it can be overprinted with a conductive silver layer, and at least three additional heating steps at higher temperature are required. The first heating burns off the higher molecular weight organic binder molecules and adheres the enamel composition to the first substrate layer. A second heating allows a second glass substrate to be mated and bent together with the first. After insertion of a vinyl sheet (e.g., polyvinylbutyral) between the first and second glass sheets, a third lower temperature heating is then needed to fuse the two glass sheets and the vinyl sheet to form a glass monolith, i.e., a laminated glass windshield pane. When the glass substrates are stacked using a conventional crystallizing enamel composition when still green, upon firing to form a mated set, the enamel on the bottom sheet can undesirably adhere to the top sheet, causing damage to either or both.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, a method of making multilayer glass structure is provided. More particularly, in accordance with this aspect, the method involves providing first and second glass sheets, and a first enamel composition layer and at least one separation layer between the first and second glass sheets; and firing the glass sheets to sinter the first enamel composition to the first glass sheet. The separation layer is selected from a group consisting of a black pigment separation layer comprising black pigment in an amount sufficient to improve separation of the first and second glass sheets, a refractory material separation layer comprising refractory material in an amount sufficient to improve separation of the first and second glass sheets, and an oxidizer separation layer comprising an oxidizer in an amount sufficient to improve separation of the first and second glass sheets.

In accordance with another aspect, another method of making multilayer glass structure is provided. The method involves forming a first enamel composition layer on a first glass sheet; forming at least one separation layer on the enamel composition layer of the first glass sheet or forming at least one separation layer on a second glass sheet; stacking the second glass sheet with the first glass sheet wherein the enamel composition layer and said at least one separation layer lie between the first and second glass sheets; and heating the stacked glass sheets to fuse the first enamel composition to the first glass sheet.

In accordance with yet another aspect, a multilayer glass structure is provided. The multilayer glass structure includes a first glass sheet and a second glass sheet; a first enamel composition layer on the first glass sheet; and at least one separation layer between the enamel composition layer and the second glass sheet.

In accordance with another aspect, the invention is a method of making multilayer glass structure, comprising: (a) providing first and, second glass sheets, (b) providing a first enamel composition layer between the first and second glass sheets, (c) providing at least one decomposable spacer between the first and second glass sheets, (d) firing the glass sheets to decompose the decomposable spacer material and to sinter the first enamel composition to the first glass sheet, wherein the at least one decomposable spacer includes at least one material selected from the group consisting of consisting of a pigment, a refractory material, and an oxidizer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention can be employed. Other objects, advantages and novel features of the invention will become apparent from the following detailed description of the invention when considered in conjunction with the drawings.

DETAILED DESCRIPTION

The subject method of making multilayer glass structure involves providing a first glass sheet and a second glass sheet, and an enamel composition layer and at least one separation layer between the first and second glass sheets. The separation layer is selected from a group consisting of a black pigment separation layer, a refractory material separation layer, and an oxidizer separation layer. Since the separation layer is provided between the first and second glass sheets, the subject method can provide one or more of the following advantages: 1) improving separation of the first and second glass sheets after firing the multilayer glass structure; 2) preventing and/or mitigating enamel sticking between the first and second glass sheets; 3) preventing and/or mitigating transfer of enamel between the first and second glass sheets (e.g., from a first glass sheet or a bottom glass sheet to a second glass sheet or a top glass sheet); and 4) improving burn-out of a binder resin in the enamel composition layer.

Figure 1A:
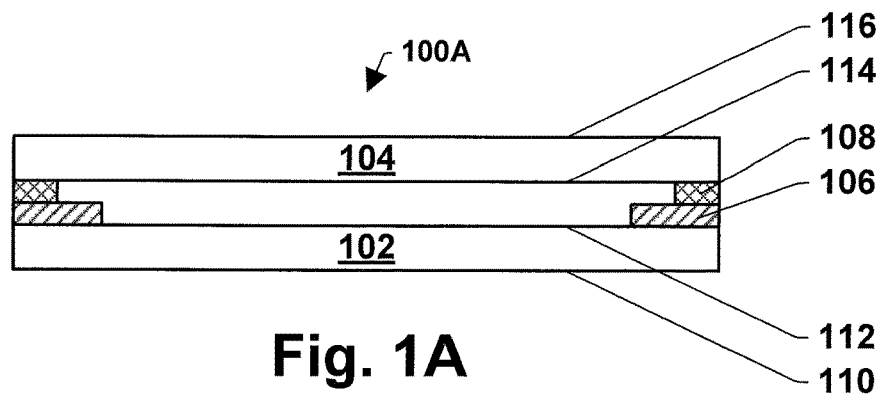
FIGS. 1-3 are process flow diagrams schematically illustrating processes of making multilayer glass structures in accordance with some aspects of the subject invention.
Figure 1B:
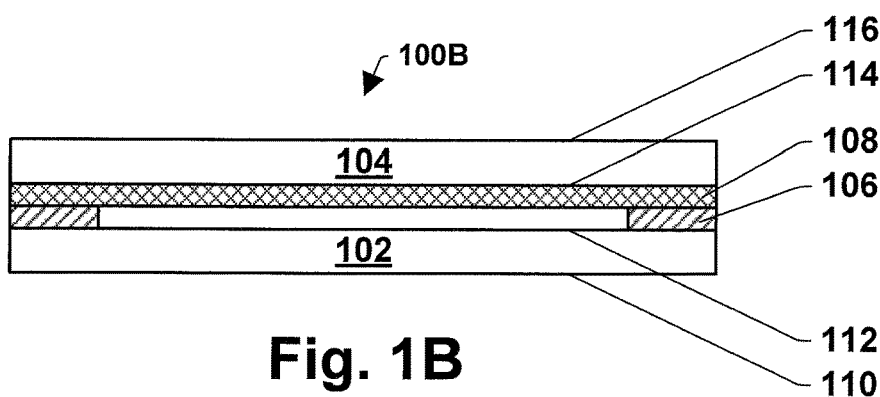
Figure 1C:
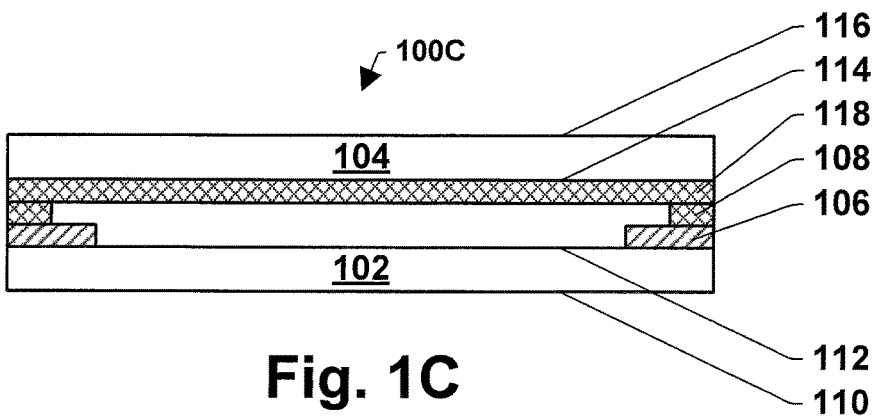

Referring now to FIGS. 1-3, three of many possible exemplary embodiments of making multilayer glass structure 100 (i.e., 100A, 100B, 100C) are illustrated. FIGS. 1A-1C schematically illustrate providing a first glass sheet 102 and a second glass sheet 104, and an enamel composition layer 106 and at least one separation layer 108, 118 between the first and second glass sheets. In particular, FIGS. 1A-1C illustrate cross-sectional views of a first glass sheet 102 and a second glass sheet 104, and an enamel composition layer 106 and at least one separation layer 108, 118 between the first and second glass sheets. Then at least one separation layer is selected from a group consisting of a black pigment separation layer, a refractory material separation layer, and an oxidizer separation layer. The separation layer can be applied to the entire surface of a glass sheet, or to only a portion thereof, for example the edge or the periphery of the glass sheet.

The first glass sheet 102 has a first surface 110 and a second surface 112. The second glass sheet 104 has a third surface 114 and a fourth surface 116. In one embodiment, as illustrated in FIG. 1A, an enamel composition layer 106 and a separation layer 108 are provided between the first and second glass sheets 102, 104 along the edges of the first and second glass sheets. The enamel composition layer 106 is provided on the edge of the second surface 112 of the first glass sheet 102. The separation layer 108 is provided on the edge of third surface 114 of the second glass sheet 104 or on the enamel composition layer 106. The separation layer can be a black pigment separation layer or a refractory material separation layer.

In another embodiment, as illustrated in FIG. 1B, an enamel composition layer 106 and a separation layer 108 are provided between the first and second glass sheets 102, 104, the enamel composition layer 106 is provided along the edges of the first sheet, and the separation layer 108 is provided on an entire surface of the second glass sheet 104. The enamel composition layer 106 is provided on the edge of the second surface 112 of the first glass sheet 102. The separation layer 108 is provided on the entire surface of the third surface 114 of the second glass sheet 104. The separation layer can be an oxidizer separation layer.

In yet another embodiment, as illustrated in FIG. 1C, one enamel composition layer 106 and two separation layers 108, 118 are provided between the first and second glass sheets 102, 104, the enamel composition layer 106 and the first separation layer 108 is provided along the edges of the first glass sheet 102, and the second separation layer 118 is provided on an entire surface of the second glass sheet 104. The enamel composition layer 106 is provided on the edge of the second surface 112 of the first glass sheet 102. The first separation layer 108 is provided on the enamel composition layer 106. The second separation layer 118 is provided on an entire surface of the third surface 114 of the second glass sheet 104. The first separation layer 108 can be a black pigment separation layer or a refractory material separation layer. The second separation layer 118 can be an oxidizer separation layer.

When the enamel composition layer and the separation layer are provided along the edge of the glass sheet, the enamel composition layer and the separation layer can individually have any suitable width that depends on the desired implementations of the multilayer glass structure 100 being fabricated. In one embodiment, the enamel composition layer and the separation layer individually have a width of about 1 mm to about 100 mm. In another embodiment, the enamel composition layer and the separation layer individually have a width of about 3 mm to about 50 mm. In yet another embodiment, the enamel composition layer and the separation layer individually have a width of about 5 mm to about 30 mm. In still yet another embodiment, the width of the separation layer is equal to or smaller than the width of the first enamel composition layer.

The enamel composition layer and the separation layer can individually have any suitable thickness that depends on the desired implementations of the multilayer glass structure 100 being fabricated. In one embodiment, the enamel composition layer and the separation layer individually have a thickness of about 5 microns to about 500 microns. In another embodiment, the enamel composition layer and the separation layer individually have a thickness of about 7 microns to about 300 microns. In yet anther embodiment, the enamel composition layer and the separation layer individually have a thickness of about 10 microns to about 200 microns.

The first and second glass sheets 102, 104 can be any suitable glass substrate, such as automotive windshields, sidelights and backlights. Other example glass sheets include insulating glass units, residential or commercial laminated windows (e.g., skylights), or transparencies for land, air, space, above water and underwater vehicles (e.g., sun or moon roofs).

Oxidizer Separation Layer.

The oxidizer separation layer typically includes the following components: an oxidizer and a vehicle for the oxidizer. The oxidizer is believed to provide molecular oxygen as it decomposes during a firing operation, which promotes elimination (combustion and/or volatilization) of an organic vehicle of the enamel composition layer prior to sintering of the enamel composition to a glass sheet. The vehicle facilitates forming the oxidizer separation layer on a glass sheet or an enamel composition layer. The oxidizer separation layer can optionally include a separation agent. The separation agent improves separation of the second glass sheet from the first glass sheet after firing the multilayer glass structure.

The oxidizer separation layer typically includes, prior to firing and by weight, 1-30% of an oxidizer and 1-70% of vehicle. The oxidizer separation layer can further include 0-10% of a separation agent. Tables 1 and 2 below show exemplary compositions of the oxidizer separation layer useful in the practice of the subject invention. The ingredient amounts for an embodiment need not be limited to those in a single column such as I, II, or III. Ingredient ranges from different columns in the same table can be combined so long as the sum of those ranges can add up to 100 wt. %.

TABLE 1

Oxidizer separation layer (weight %)

| | Oxidizer separation layer | | |
|---|---|---|---|
| Ingredient | I | II | III |
| Oxidizer | 1-30 | 2-20 | 2-15 |
| Vehicle | 60-99 | 73-98 | 80-98 |
| Separation agent | 0-10 | 0-7 | 0-5 |

TABLE 2

Oxidizer separation layer

| | Oxidizer separation layer | | |
|---|---|---|---|
| Ingredient | IV | V | VI |
| Oxidizer | 1-30 | 2-20 | 2-15 |
| Vehicle | 60-99 | 73-98 | 80-98 |
| Separation agent | 0.1-10 | 0.5-7 | 1-5 |

Oxidizer.

The oxidizer can be any suitable material as long as the material can facilitate to provide molecular oxygen as it decomposes during a firing operation, thereby promoting elimination (combustion and/or volatilization) of an organic vehicle of the enamel composition layer. The oxidizer component can include one or more oxidizers, that is, compounds that release molecular oxygen upon decomposition. The oxidizer can be lead-free and such oxidizer can include at least two oxygen atoms for every molecule of oxidizer. Released oxygen can facilitate to initiate and/or sustain combustion of an organic vehicle of an enamel composition layer as the multilayer glass structure is fired. Depending on the firing profile of the enamel compositions, suitable combinations of oxidizers are chosen to provide adequate oxygen to facilitate complete burnout of the organic vehicle.

In one embodiment, it is necessary that the oxidizers decompose and that the organic vehicle of the enamel composition layer burns out before the onset of sintering of a frit in the enamel composition layer. If sintering precedes oxidizer decomposition, then carbon ash may be trapped within the enamel in the last moments of sintering, thereby causing graying and blistering of the black enamel. Such a result would be undesirable or unacceptable in any application. Such a porous glass-ceramic film would have poor scratch resistance and mechanical integrity and may not adhere sufficiently to the glass sheet to which it was applied, and/or may not adhere sufficiently to the laminate during the laminating heating process, which could eventually cause poor structural integrity or delamination.

The oxidizer separation layer can include any suitable amount of an oxidizer depending on the desired implementations of the multilayer glass structure 100 being fabricated. In one embodiment, the oxidizer separation layer includes an oxidizer at about 1 wt % or more and about 30 wt % or less of the oxidizer separation layer. In another embodiment, the oxidizer separation layer includes an oxidizer at about 1 wt % or more and about 20 wt % or less of the oxidizer separation layer. In yet another embodiment, the oxidizer separation layer includes an oxidizer at about 2 wt % or more and about 15 wt % or less of the oxidizer separation layer.

Particle size can have an effect on the efficacy of the oxidizer. The oxidizer particle size can be about the same as a glass frit particle size of the enamel composition layer. Oxidizers such as bismuth subnitrate ground to average particle sizes ($D_{50}$) of 8-13 μm are useful. Others such as manganese dioxide particles having $D_{50}$ in the range of 1-5 μm can be useful. Oxidizers useful in the practice of the present invention include any that evolve oxygen at a temperature within a firing temperature profile of a multilayer glass structure and/or an enamel composition.

In one embodiment, an average particle size ($D_{50}$) of the oxidizer is about 0.5 μm or more and about 30 μm or less. In another embodiment, an average particle size ($D_{50}$) of the oxidizer is about 1 μm or more and about 20 μm or less. In yet another embodiment, an average particle size ($D_{50}$) of the oxidizer is about 1 μm or more and about 15 μm or less.

Suitable oxidizers include, in general, oxides, peroxides, nitrates, nitrites, subnitrates, chlorates, bromates, sulfates and phosphates. The suitable oxidizers can release molecular oxygen upon decomposition at a temperature compatible with the decomposition of the organic vehicle of the enamel composition layer within the firing temperature range used to fire and fuse the enamel composition to a glass sheet in the process of making a multilayer glass structure. In particular, oxidizers envisioned as useful in the invention include oxides and peroxides of antimony, bismuth, calcium, magnesium, manganese, nickel, potassium, sodium, strontium, tellurium or zinc; nitrates, nitrites, and subnitrates of ammonium, barium, bismuth, calcium, cesium, cobalt, copper, lithium, magnesium, potassium, sodium, strontium, or tin; chlorates of sodium or potassium; bromates of sodium or potassium; sulfates of sodium or potassium; and phosphates of sodium or potassium. Exemplary oxides and their decomposition temperatures are presented in Table 3. In one embodiment, the oxidizer is selected from a group consisting of ammonium nitrate, sodium nitrate, sodium nitrite, and potassium nitrite. In another embodiment, the oxidizer layer includes only ammonium nitrate as an oxidizer because it would not leave sodium or potassium behind after decomposition.

TABLE 3

Oxidizers and their decomposition temperatures.

| Compound | Formula | Melt point ° C. (decomposes) | Boiling point ° C. (decomposes) |
|---|---|---|---|
| Ammonium nitrate | $NH_4NO_3$ | 169.6 | 210 |
| Antimony pentoxide | $Sb_2O_5$ | 380 | |
| Barium nitrate | $Ba(NO_3)_2$ | 592 | |
| Bismuth pentoxide | $Bi_2O_5$ | 150 | 357 |
| Bismuth subnitrate | $BiONO_3$ | 260 | 335 |
| Bismuth tetroxide | $Bi_2O_4$ | 305 | |

TABLE 3-continued

Oxidizers and their decomposition temperatures.

| Compound | Formula | Melt point ° C. (decomposes) | Boiling point ° C. (decomposes) |
|---|---|---|---|
| Calcium nitrate | $Ca(NO_3)_2$ | 561 | |
| Calcium peroxide | $CaO_2$ | 275 | |
| Cesium nitrate | $CsNO_3$ | 414 | |
| Cobalt nitrate | $Co(NO_3)_2$ | 100 | |
| Copper nitrate | $Cu(NO_3)_2$ | 255 | |
| Lithium nitrate | $LiNO_3$ | 253 | |
| Magnesium peroxide | $MgO_2$ | 100 | |
| Manganese dioxide | $MnO_2$ | 535 | |
| Nickel (III) oxide | $Ni_2O_3$ | 600 | |
| Platinum dioxide | $PtO_2$ | 450 | |
| Potassium bromate | $KBrO_3$ | 370 | 434 |
| Potassium chlorate | $KClO_3$ | 368 | 400 |
| Potassium iodate | $KIO_3$ | 560 | |
| Potassium nitrate | $KNO_3$ | 337 | 400 |
| Potassium nitrite | $KNO_2$ | 440 | 537 |
| Potassium peroxide | $K_2O_2$ | 490 | |
| Silver nitrate | $AgNO_3$ | 212 | |
| Sodium bromate | $NaBrO_3$ | 381 | |
| Sodium chlorate | $NaClO_3$ | 248 | |
| Sodium nitrate | $NaNO_3$ | 306.8 | 380 |
| Sodium nitrite | $NaNO_2$ | 271 | |
| Sodium percarbonate | $2Na_2CO_3 \cdot 3H_2O_2$ | 50 | |
| Sodium peroxide | $Na_2O_2$ | 460 | 657 |
| Strontium nitrate | $Sr(NO_3)_2$ | 570 | 645 |
| Strontium peroxide | $SrO_2$ | 215 | |
| Tellurium trioxide | $TeO_3$ | 430 | |
| Tin nitrate | $Sn(NO_3)_4$ | 50 | |
| Zinc peroxide | $ZnO_2$ | 150 | 212 |

Separation Agent.

The separation agent can be any suitable material as long as the material can facilitate to improve separation of the second glass sheet from the first glass sheet after firing the multilayer glass structure. Examples of separation agents include talc, diatomite, diatomaceous earth, calcium carbonate, calcium bentonite, pyrophyllite, vermicullite, illite, phlogopite, muscovite clay, kaolinite clay, attapulgite (palygorskite), sepiolite clay, alganite, tobermorite, marl, calcined clay, zeolite, silica, silica gel, sand, and fullers earth. In one embodiment, the separation agent is selected from a group consisting of talc, diatomite, and diatomaceous earth. The separation agent can be lead-free.

The oxidizer separation layer can include any suitable amount of a separation agent depending on the desired implementations of the multilayer glass structure 100 being fabricated. In one embodiment, the oxidizer separation layer includes a separation agent at about 1 wt % or more and about 30 wt % or less of the oxidizer separation layer. In another embodiment, the oxidizer separation layer includes a separation agent at about 1 wt % or more and about 20 wt % or less of the oxidizer separation layer. In yet another embodiment, the oxidizer separation layer includes a separation agent at about 2 wt % or more and about 15 wt % or less of the oxidizer separation layer.

Particle size of the separation agent can have an effect on the efficacy of the separation agent. In one embodiment, an average particle size ($D_{50}$) of the separation agent is about 0.5 μm or more and about 30 μm or less. In another embodiment, an average particle size ($D_{50}$) of the separation agent is about 1 μm or more and about 20 μm or less. In yet another embodiment, an average particle size ($D_{50}$) of the separation agent is about 1 μm or more and about 15 μm or less.

Separation Layer Vehicle.

The vehicle can be any suitable material as long as the material can facilitate forming the oxidizer separation layer on a glass sheet or an enamel composition layer. Examples of vehicles include water and solvent including ethanol, polyols such as propyleneglycol, polyethyleneglycol, glycerol. In one embodiment, the vehicle does not include an organic solvent. In another embodiment, the vehicle is only water.

The oxidizer separation layer can include any suitable amount of a vehicle depending on the desired implementations of the multilayer glass structure 100 being fabricated. In one embodiment, the oxidizer separation layer includes a vehicle at about 80 wt % or more and about 98 wt % or less of the oxidizer separation layer. In another embodiment, the oxidizer separation layer includes a vehicle at about 85 wt % or more and about 98 wt % or less of the oxidizer separation layer. In yet another embodiment, the oxidizer separation layer includes a vehicle at about 90 wt % or more and about 98 wt % or less of the oxidizer separation layer.

Black Pigment Separation Layer.

The black pigment separation layer typically includes the following components: a black pigment and a vehicle for the black pigment. The black pigment improves separation of the second glass sheet from the first glass sheet after firing the multilayer glass structure. The vehicle facilitates forming the black pigment separation layer on a glass sheet or an enamel composition layer. The black pigment separation layer can optionally include a refractory material, rheology-modifying agent, zinc oxide, oxidizer, and combinations thereof.

The black pigment separation layer typically includes, prior to firing and by weight, 30-60% of a black pigment and 40-70% of a vehicle. The black pigment separation layer can optionally further include 0-10% of a refractory material, 0-1% of a rheology-modifying agent, 0-3% of zinc oxide, and 0-10% of oxidizer. Tables 4 and 5 below show exemplary compositions of the black pigment separation layer useful in the practice of the subject invention. The ingredient amounts for an embodiment need not be limited to those in a single column such as I, II, or III. Ingredient ranges from different columns in the same table can be combined so long as the sum of those ranges can add up to 100 wt. %.

TABLE 4

Black pigment separation layer (weight %).

| | Black pigment separation layer | | |
|---|---|---|---|
| Ingredient | I | II | III |
| Black pigment | 30-60 | 35-55 | 40-50 |
| Vehicle | 40-70 | 45-65 | 50-60 |

TABLE 5

Black pigment separation layer (weight %).

| | Black pigment separation layer | | |
|---|---|---|---|
| Ingredient | IV | V | VI |
| Black pigment | 30-60 | 35-55 | 40-50 |
| Vehicle | 40-70 | 45-65 | 50-60 |
| Refractory material | 0.1-10 | 0.2-7 | 0.5-5 |
| Rheology-modifying agent | 0.01-1 | 0.02-0.5 | 0.05-0.2 |
| Zinc oxide | 0.05-5 | 0.05-3 | 0.1-1 |
| Oxidizer | 0.1-10 | 0.1-5 | 0.1-3 |

Black Pigment.

The black pigment can be any suitable material as long as the material can facilitate to improve separation of the second glass sheet from the first glass sheet after firing the multilayer glass structure. Typical mixed metal oxide pigments used to produce black colors in the automotive industry include oxides of copper, chromium, iron, cobalt, nickel, manganese, and other transition metals. In one embodiment, black spinel pigments are used in the black pigment separation layer. In another embodiment, metal oxide pigments that produce colors other than black can be combined with the black pigment and used in the black pigment separation layer.

Useful pigments can come from several of the major classifications of complex inorganic pigments, including corundum-hematite, olivine, priderite, pyrochlore, rutile, spinel, and though other categories such as baddeleyite, borate, garnet, periclase, phenacite, phosphate, sphene and zircon can be suitable in certain applications. Examples of pigments include cobalt silicate blue olivine $Co_2SiO_4$; nickel barium titanium primrose priderite $2NiO:3BaO:17TiO_2$; lead antimonite yellow pyrochlore $Pb_2Sb_2O_7$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$.

The black pigment separation layer can include any suitable amount of a black pigment depending on the desired implementations of the multilayer glass structure 100 being fabricated, for example, the range of color, gloss, and opacity desired. In one embodiment, the black pigment separation layer includes a black pigment at about 30 wt % or more and about 60 wt % or less of the black pigment separation layer. In another embodiment, the black pigment separation layer includes a black pigment at about 35 wt % or more and about 55 wt % or less of the black pigment separation layer. In yet another embodiment, the black pigment separation layer includes a black pigment at about 40 wt % or more and about 50 wt % or less of the black pigment separation layer.

Black Pigment Separation Layer Vehicle.

The vehicle of the black pigment separation layer can be any suitable material as long as the material can facilitate forming the black pigment separation layer on a glass sheet or an enamel composition layer. Examples of vehicles include water and solvent including ethanol, polyols such as propyleneglycol, polyethyleneglycol, glycerol. In one embodiment, the vehicle does not include an organic solvent. In another embodiment, the vehicle is only water.

The black pigment separation layer can include any suitable amount of a vehicle depending on the desired implementations of the multilayer glass structure 100 being fabricated. In one embodiment, the black pigment separation layer includes a vehicle at about 40 wt % or more and about 70 wt % or less of the black pigment separation layer. In another embodiment, the black pigment separation layer includes a vehicle at about 45 wt % or more and about 65 wt % or less of the black pigment separation layer. In yet another embodiment, the black pigment separation layer includes a vehicle at about 50 wt % or more and about 60 wt % or less of the black pigment separation layer.

In one embodiment, the black pigment separation layer optionally includes a refractory material. The refractory material can be any suitable material as long as the material can facilitate to improve separation of the second glass sheet from the first glass sheet after firing the multilayer glass structure. Examples of refractory materials include aluminium nitride, aluminium oxide, antimony pentoxide, antimony tin oxide, bismuth silicate, brass, calcium carbonate, calcium chloride, calcium oxide, carbon black, cerium, cerium oxide, cobalt, cobalt oxide, copper oxide, gold, hastelloy, hematite-(alpha, beta, amorphous, epsilon, and gamma), indium tin oxide, iron-cobalt alloy, iron-nickel alloy, iron oxide, iron sulphide, lanthanum, lead sulphide, lithium manganese oxide, lithium titanate, lithium vanadium oxide, luminescent, magnesia, magnesium, magnesium oxide, magnetite, manganese oxide, molybdenum, molybdenum oxide, montmorillonite clay, nickel, niobia, niobium, niobium oxide, silicon carbide, silicon dioxide preferably amorphous silicon dioxide, silicon nitride, silver, specialty, stainless steel, talc, tantalum, tin, tin oxide, titania, titanium, titanium diboride, titanium dioxide, tungsten, tungsten carbide-cobalt, tungsten oxide, vanadium oxide, yttria, yttrium, yttrium oxide, zinc, zinc oxide, zinc silicate, zirconium, zirconium oxide, and zirconium silicate. In one embodiment, the pigment separation layer includes one or more selected from a group consisting of zirconium silicate, aluminum oxide, bismuth silicate, and zinc silicate.

The black pigment separation layer can include any suitable amount of a refractory material depending on the desired implementations of the multilayer glass structure 100 being fabricated. In one embodiment, the black pigment separation layer includes a refractory material at about 0.1 wt % or more and about 10 wt % or less of the black pigment separation layer. In another embodiment, the black pigment separation layer includes a refractory material at about 0.2 wt % or more and about 7 wt % or less of the black pigment separation layer. In yet another embodiment, the black pigment separation layer includes a refractory material at about 0.5 wt % or more and about 5 wt % or less of the black pigment separation layer.

In one embodiment, the black pigment separation layer optionally includes zinc oxide. The black pigment separation layer can include any suitable amount of zinc oxide depending on the desired implementations of the multilayer glass structure 100 being fabricated. In one embodiment, the black pigment separation layer includes zinc oxide at about 0.05 wt % or more and about 5 wt % or less of the black pigment separation layer. In another embodiment, the black pigment separation layer includes zinc oxide at about 0.05 wt % or more and about 3 wt % or less of the black pigment separation layer. In yet another embodiment, the black pigment separation layer includes zinc oxide at about 0.1 wt % or more and about 1 wt % or less of the black pigment separation layer.

Rheology-Modifying Agents.

In one embodiment, the black pigment separation layer optionally includes a rheology-modifying agent. A rheology-modifying agent is used to adjust the viscosity of the black pigment separation layer. A variety of rheological modifiers can be used. Examples of suitable rheology-modifying agents include thixiotropic materials and fillers. Examples of suitable fillers include silicon dioxides, talc, woolastonites, mica, alumina trihydrates, clays, silica quartz, calcium carbonates, magnesium carbonates, barium carbonates, calcium sulfates, magnesium sulfates, and combinations thereof. Examples of suitable commercially available fillers include silicon dioxides under the trademark "AEROSIL®," fumed silicas from Degussa GmbH, Frankfurt, Germany, and silica quartz fillers under the series "BENTONE®" (e.g., Bentone 34) from Elementis-Specialties, Inc., Hightstown, N.J.

The black pigment separation layer can include any suitable amount of a rheology-modifying agent depending on the desired implementations of the multilayer glass structure 100 being fabricated. In one embodiment, the black pigment separation layer includes a rheology-modifying agent at about 0.01 wt % or more and about 1 wt % or less of the black pigment separation layer. In another embodiment, the black pigment separation layer includes a rheology-modifying agent at about 0.01 wt % or more and about 0.5 wt % or less of the black pigment separation layer. In yet another embodiment, the black pigment separation layer includes a rheology-modifying agent at about 0.01 wt % or more and about 0.2 wt % or less of the black pigment separation layer.

In one embodiment, the black pigment separation layer optionally includes an oxidizer. The oxidizer can be any suitable material as long as the material can facilitate to provide molecular oxygen as it decomposes during a firing operation, thereby promoting elimination (combustion and/or volatilization) of an organic vehicle of the enamel composition layer. In one embodiment, the black pigment separation layer includes the same oxidizer as described in connection with the oxidizer of the oxidizer separation layer. The black pigment separation layer can include any suitable amount of an oxidizer depending on the desired implementations of the multilayer glass structure 100 being fabricated. In one embodiment, the black pigment separation layer includes an oxidizer at about 0.1 wt % or more and about 10 wt % or less of the black pigment separation layer. In another embodiment, the black pigment separation layer includes an oxidizer at about 0.1 wt % or more and about 5 wt % or less of the black pigment separation layer. In yet another embodiment, the black pigment separation layer includes an oxidizer at about 0.1 wt % or more and about 3 wt % or less of the black pigment separation layer.

Refractory Material Separation Layer.

The refractory material separation layer typically includes the following components: a refractory material and a vehicle for the refractory material. The refractory material improves separation of the second glass sheet from the first glass sheet after firing the multilayer glass structure. The vehicle facilitates forming the refractory material separation layer on a glass sheet or an enamel composition layer. The refractory material separation layer can optionally include a rheology-modifying agent and an oxidizer.

The refractory material separation layer typically includes, prior to firing and by weight, 30-60% of a refractory material and 40-70% of a vehicle. The refractory material separation layer can optionally further include 0-1% of a rheology-modifying agent and 0-7% of an oxidizer. Tables 6 and 7 below show exemplary compositions of the refractory material separation layer useful in the practice of the subject invention. The ingredient amounts for an embodiment need not be limited to those in a single column such as I, II, or III. Ingredient ranges from different columns in the same table can be combined so long as the sum of those ranges can add up to 100 wt. %.

TABLE 6

Refractory material separation layer (weight %).

| Ingredient | Refractory material separation layer | | |
|---|---|---|---|
|  | I | II | III |
| Refractory material | 20-80 | 30-70 | 35-65 |
| Vehicle | 20-80 | 30-70 | 35-65 |

TABLE 7

Refractory material separation layer (weight %).

| Ingredient | Refractory material separation layer | | |
|---|---|---|---|
|  | IV | V | VI |
| Black spinel pigment | 20-70 | 30-70 | 35-65 |
| Vehicle | 22-80 | 25-65 | 32-60 |
| Rheology-modifying agent | 0.01-1 | 0.02-0.5 | 0.05-0.2 |
| Oxidizer | 0.1-7 | 0.1-5 | 0.1-3 |

Refractory Material.

The refractory material can be any suitable material as long as the material can facilitate to improve separation of the second glass sheet from the first glass sheet after firing the multilayer glass structure. In one embodiment, the refractory material separation layer includes any refractory material as described in connection with the refractory material of the black pigment separation layer. In another embodiment, the refractory material separation layer includes one or more selected from a group consisting of zirconium silicate, aluminum oxide, bismuth silicate, and zinc silicate.

The refractory material separation layer can include any suitable amount of a refractory material depending on the desired implementations of the multilayer glass structure 100 being fabricated. In one embodiment, the refractory material separation layer includes a refractory material at about 20 wt % or more and about 80 wt % or less of the refractory material separation layer. In another embodiment; the refractory material separation layer includes a refractory material at about 30 wt % or more and about 70 wt % or less of the refractory material separation layer. In yet another embodiment, the refractory material separation layer includes a refractory material at about 35 wt % or more and about 65 wt % or less of the refractory material separation layer.

Refractory Material Separation Layer Vehicle.

The vehicle of the refractory material separation layer can be any suitable material as long as the material can facilitate forming the refractory material separation layer on a glass sheet or an enamel composition layer. Examples of vehicles include water and solvents including ethanol, polyols such as propyleneglycol, polyethyleneglycol, glycerol. In one embodiment, the vehicle does not include an organic solvent. In another embodiment, the vehicle is only water.

The refractory material separation layer can include any suitable amount of a vehicle depending on the desired implementations of the multilayer glass structure 100 being fabricated. In one embodiment, the refractory material separation layer includes a vehicle at about 20 wt % or more and about 80 wt % or less of the refractory material separation layer. In another embodiment, the refractory material separation layer includes a vehicle at about 30 wt % or more and about 70 wt % or less of the refractory material separation layer. In yet another embodiment, the refractory material separation layer includes a vehicle at about 35 wt % or more and about 65 wt % or less of the refractory material separation layer.

Refractory Material Separation Layer Rheology-Modifying Agents.

In one embodiment, the refractory material separation layer optionally includes a rheology-modifying agent. The refractory material separation layer can include any rheology-modifying agent as described in connection with the rheology-modifying agent of the black pigment separation layer. The refractory material separation layer can include any suitable amount of a rheology-modifying agent depending on the desired implementations of the multilayer glass structure 100 being fabricated. In one embodiment, the refractory material separation layer includes a rheology-modifying agent at about 0.01 wt % or more and about 1 wt % or less of the refractory material separation layer. In another embodiment, the refractory material separation layer includes a rheology-modifying agent at about 0.02 wt % or more and about 0.5 wt % or less of the refractory material separation layer. In yet another embodiment, the refractory material separation layer includes a rheology-modifying agent at about 0.05 wt % or more and about 2 wt % or less of the refractory material separation layer.

Refractory Material Separation Layer Oxidizers.

In one embodiment, the refractory material separation layer optionally includes an oxidizer. The oxidizer can be any suitable material as long as the material can facilitate to provide molecular oxygen as it decomposes during a firing operation, thereby promoting elimination (combustion and/or volatilization) of an organic vehicle of the enamel composition layer. In one embodiment, the refractory material separation layer includes any oxidizer as described in connection with the oxidizer of the oxidizer separation layer. In another embodiment, the refractory material separation layer can include any oxidizer disclosed elsewhere herein. The refractory material separation layer can include any suitable amount of an oxidizer depending on the desired implementations of the multilayer glass structure 100 being fabricated. In one embodiment, the refractory material separation layer includes an oxidizer at about 0.1 wt % or more and about 7 wt % or less of the refractory material separation layer. In another embodiment, the refractory material separation layer includes an oxidizer at about 0.1 wt % or more and about 0.5 wt % or less of the refractory material separation layer. In yet another embodiment, the refractory material separation layer includes an oxidizer at about 0.1 wt % or more and about 3 wt % or less of the refractory material separation layer.

Method of Forming Separation Layer.

One or more separation layers can be formed on the glass sheets and/or on the enamel composition layer by any suitable techniques in a desired pattern. The separation layer can be applied in any suitable forms such as solution, slurry, tape, and disk. In one embodiment, the separation layer is formed by spraying a slurry or solution of the separation layer composition on the enamel composition layer 106 and/or the third surface 114. In another embodiment, the separation layer is formed by screen-printing, decal application, brushing, roller coating, and the like. The separation layer can be formed on only portion of the enamel composition layer 106 and/or the third surface 114 (e.g., edge or periphery). In one embodiment, the separation layer is formed on the entire surface of the enamel composition layer 106 and/or the third surface 114.

In one embodiment, the separation layers do not include a glass frit. Since the separation layers do not include a glass frit, the separation layers are not sintered on the glass sheet during a firing operation. In another embodiment, the separation layers do not include organic vehicles.

Enamel Composition Layer.

The enamel composition layer typically includes the following components: a glass frit; a colorant (e.g., pigment), and a vehicle. The enamel composition layer can optionally include a seed material, which is believed to assist in nucleating and growing microcrystalline structures. The details of the composition and manufacture of enamel composition can be found in, for example, commonly-assigned U.S. Pat. Nos. 6,936,556 and 7,832,233, which are hereby incorporated by reference.

The enamel composition typically includes, prior to firing and by weight, 20-80% of a glass component comprising one or more reactive glass frits, 10-40% of a pigment, and 10-40% of an organic vehicle. The enamel composition can further include 0.1-20% of a seed material. The enamel composition can alternatively include by weight 20-80% of a lower melting (e.g., 450-550° C.) reactive glass frit and 10-50% of a higher melting (e.g., 580-680° C.) reactive glass frit. All compositional percentages are by weight and are given for a blend prior to firing. Details on each ingredient are as follows.

Glass Component.

The glass component, which comprises reactive glass frits, includes by weight about 20-80% of the enamel composition. The reactive frits can contain oxide frits, sulfide frits or combinations thereof. The term "reactive glass frits" means that at least 30% by weight of the oxides contained in the frits react upon firing to form crystallization products. Suitable oxide frits include borosilicate frits, for example, bismuth borosilicate frits and zinc borosilicate frits. More details on suitable glass frits may be found in U.S. Pat. No. 5,153,150 (Ruderer et al.) and U.S. Pat. No. 6,207,285 (Sakoske et al.), both commonly owned herewith, and both incorporated by reference herein. Representative oxide frits that can be used in the present invention have the compositions, prior to firing, shown in Table 8 below.

TABLE 8

| | Oxide Frit Compositions (weight %). | | | | | | | |
|---|---|---|---|---|---|---|---|---|
| Ingredient | Range 1 | Range 2 | Range 3 | Range 4 | Range 5 | Range 6 | Range 7 | Range 8 |
| $Bi_2O_3$ + ZnO | 1-99 | 5-95 | | | | | | |
| $B_2O_3$ | | | 1-20 | 10-35 | 0.1-9 | 0.1-9 | 21-60 | 21-60 |

TABLE 8-continued

Oxide Frit Compositions (weight %).

| Ingredient | Range 1 | Range 2 | Range 3 | Range 4 | Range 5 | Range 6 | Range 7 | Range 8 |
|---|---|---|---|---|---|---|---|---|
| $SiO_2$ | 0.1-28 | 0.1-28 | 5-50 | 5-50 | 0.1-28 | 0.1-28 | 0.1-28 | 0.1-28 |
| $Bi_2O_3$ | | | 15-60 | | 9-75 | 9-75 | 9-75 | |
| ZnO | | | 5-50 | 5-50 | 0.1-11 | | 0.1-11 | 21-50 |

As can be seen above, the composition of the glass frits are not critical. Each frit composition can additionally contain glass-modifying oxide and/or sulfide ingredients as known in the art. Exemplary glass modifying oxides include $TiO_2$, $ZrO_2$, $Al_2O_3$, $K_2O$, $Li_2O$, $Na_2O$, $F_2$, $Nb_2O_5$, $CeO_2$, $Sb_2O_3$, BaO, CaO, SrO, MgO, SnO, $Cr_2O_3$, NiO, CoO, oxides of manganese, for example MnO or $Mn_2O_3$, oxides of iron, for example $Fe_2O_3$ or FeO, oxides of copper, for example CuO or $Cu_2O$, oxides of molybdenum, for example MoO or $Mo_2O_3$, oxides of tungsten, for example $WO_3$ or $WO_2$. Oxides of different oxidation states of the aforementioned metals are also envisioned. Also envisioned are glass frits, which intentionally include PbO and/or CdO, or frits which intentionally exclude them, depending on desired performance and environmental considerations.

Broadly, useful amounts of such additional oxides include 0-10% $TiO_2$, 0-7% $ZrO_2$, 0-7% $Al_2O_3$, 0-10% $K_2O$, 0-5% $Li_2O$, 0-15% $Na_2O$, 0-7% $F_2$, 0-4% $Nb_2O_5$, 0-4% $CeO_2$, 0-4% $Sb_2O_3$, 0-20% BaO, 0-20% CaO, 0-20% SrO, 0-10% MgO, 0-20% SnO, 0-10% $Cr_2O_3$, 0-8% NiO, 0-10% CoO, 0-25% oxides of manganese, 0-20% oxides of iron, 0-10% oxides of copper, 0-4% oxides of molybdenum, and 0-5% oxides of tungsten. Preferably, each range in this paragraph has a lower bound of 0.1% instead of zero.

Sulfide glass frits are glass frits that contain a metal sulfide component. Sulfide glass frits useful herein are disclosed in U.S. Pat. No. 5,350,718 to Antequil et al., which is hereby incorporated by reference. Exemplary sulfides in such frits include ZnS, MnS, FeS, CoS, NiS, $Cu_2S$, CdS, $Sb_2S_3$ and $Bi_2S_3$. In one embodiment, the sulfide is ZnS. A glass composition containing both oxide and sulfide frits is also envisioned. The glass frits useful herein have melting points in the range of about 450° C. to about 750° C., or any intermediate temperature such as 500° C., 550° C., 580° C., 600° C., 630° C., 650° C., 680° C., or 700° C., and various of the frits can be effectively fired at those temperatures.

The glass frits are formed in a known manner, for example, blending the starting materials (oxides and/or sulfides) and melting together at a temperature of about 1020-1300° C. for about 40 minutes to form a molten glass having the desired composition. The molten glass formed can then be suddenly cooled in a known manner (e.g., water quenched) to form a frit. The frit can then be ground using conventional milling techniques to a fine particle size, from about 1 to about 8 microns, preferably 2 to about 6 microns, and more preferably from about 3 to about 5 microns.

Enamel Composition Pigments.

The finely ground glass frit can be combined with a mixed metal oxide pigment. The enamel composition layer can include any pigment as described in connection with the pigment of the black pigment separation layer. The pigment generally constitutes about 10 to about 40% of the enamel compositions herein, depending upon the range of color, gloss, and opacity desired.

Enamel Composition Seed Material.

The enamel compositions can optionally contain up to about 20% (e.g., 0.1-20% or 2-10%) of a seed material such as bismuth silicates, zinc silicates, and bismuth titanates. The seed materials can include one or more of $Zn_2SiO_4$, $Bi_{12}SiO_{20}$, $Bi_4(SiO_4)_3$, $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$. U.S. Pat. No. 6,624,106 (Sakoske et al.) and U.S. Pat. No. 5,208,191 (Ruderer, et al.) provide further information on seed material; both patents are commonly owned herewith and incorporated by reference.

Enamel Layer Organic Vehicle.

The foregoing solid ingredients of the enamel composition layer are combined with an organic vehicle to form the green enamel composition, which is a paste. The green enamel paste in general contains 60 to 90% solids as above described and 10 to 40% of an organic vehicle. The viscosity of the paste is adjusted so that it can be screen-printed, roll coated or sprayed onto the desired substrate.

The organic vehicle can include a binder (also known as a resin) and a solvent, which are selected based on the intended application. It is essential that the vehicle adequately suspend the particulates (i.e., frit, oxidizer, pigment, seed) and burn off completely upon firing. In particular, binders including methyl cellulose, ethyl cellulose, and hydroxypropyl cellulose, ethyl hydroxyethyl cellulose, wood rosin, mixtures of ethyl cellulose and phenolic resins, polymethacrylates of lower alcohols and the monobutyl ether of ethylene glycol monoacetate, polyvinyl butanol, polyvinyl alcohol, polyvinyl acetate and combinations thereof, can be used.

Suitable solvents include acetone; toluene; ethanol; tridecyl alcohol; propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); diethylene glycol monobutyl ether acetate (Butyl Carbitol™ acetate); pine oils, vegetable oils, mineral oils, low molecular weight petroleum fractions, alcohol esters, kerosene, and dibutyl phthalate and synthetic or natural resins and blends thereof.

Other dispersants, surfactants and rheology modifiers, which are commonly used in paste formulations, may be included. Commercial examples of such products include those sold under any of the following trademarks: Texanol™, (Eastman Chemical Company, Kingsport, Tenn.); Dowanol™ and Carbitol™, (Dow Chemical Co., Midland, Mich.); Triton™, (Union Carbide Division of Dow Chemical Co., Midland, Mich.), Thixatrol™, (Elementis Company, Hightstown N.J.), and Diffusol™, (Transene Co. Inc., Danvers, Mass.).

Among commonly used organic thixotropic agents is hydrogenated castor oil and derivatives thereof. Furthermore, wetting agents may be employed such as fatty acid esters, e.g., N-tallow-1,3-diaminopropane di-oleate; N-tallow trimethylene diamine diacetate; N-coco trimethylene diamine, beta diamines; N-oleyl trimethylene diamine; N-tallow trimethylene diamine; N-tallow trimethylene diamine dioleate, and combinations thereof.

Surfactants and/or other film forming modifiers can also be included. The solvent and binder can be present in a weight ratio of about 50:1 to about 20:1. The preferred vehicle is a combination of Butyl Carbitol™ (diethylene glycol monobutyl ether) and ethyl cellulose in a weight ratio of about 200:1 to about 20:1, 50:1 to about 20:1, more preferably about 40:1 to about 25:1.

The enamel composition does not require the use of inorganic binders such as silica gels. Preferably, the enamel composition contains less than 3% by weight silica gels since such materials are difficult to mix with the other components of the enamel composition. More preferably, the enamel composition is substantially free of silica gels. Preferably, the vehicle can be dried and substantially all of the solvents are removed at a temperature of less than 200° C.

In general, the enamel pastes are viscous in nature, with the viscosity depending upon the application method to be employed and end use. For purposes of screen-printing, viscosities ranging from 10,000 to 80,000 centipoise, preferably 15,000 to 35,000 centipoise, and more preferably 18,000 to 28,000 centipoise at 20° C., as determined on a Brookfield Viscometer, #29 spindle at 10 rpm, are appropriate.

Spacers. Pellets or support structures, (i.e., "spacers") including at least one of organic binder materials and oxidizing materials can be placed between glass sheets during the IPW process. Such spacers can be placed by a robot arm or other means immediately after screen-printing with an enamel, either before or after drying. A variety of oxidizers, including those disclosed elsewhere herein in any combination, can be included in such spacers. Preferred oxidizers include the nitrates of ammonium, sodium or potassium. The most preferred is ammonium nitrate. The oxidizers decompose during heating to liberate oxygen. According to the necessary heating profile of a given enamel composition, a series of oxidizers from Table 3 can be chosen such that at a series of oxidizers is decomposing essentially continuously, for the continuous production of oxygen during an entire firing cycle.

The spacer pellets may include any or all of pigments, waxes, cellulose, and/or any organic binder material and/or solvent disclosed elsewhere herein. Binders impart green strength to the spacer and delay decomposition and elimination until higher temperatures are reached thus delaying the point at which the glass substrates contact one another or the point at which the non-printed substrate contacts the enamel composition applied to the first substrate. A plurality of hot wax droplets as spacers is also envisioned.

Also envisioned is a method of making a multilayer glass structure, comprising: (a) providing first and second glass sheets, (b) providing a first enamel composition layer between the first and second glass sheets, (c) providing at least one decomposable spacer between the first and second glass sheets, and (d) firing the glass sheets to decompose the decomposable spacer material and to sinter the first enamel composition to the first glass sheet, wherein the at least one decomposable spacer includes a material selected from the group consisting of consisting of a binder, a pigment, a refractory material, and an oxidizer.

The binder may be selected from the following in any combination: methyl cellulose, ethyl cellulose, and hydroxypropyl cellulose, ethyl hydroxyethyl cellulose, wood rosin, mixtures of ethyl cellulose and phenolic resins, polymethacrylates of lower alcohols and the monobutyl ether of ethylene glycol monoacetate, polyvinyl butanol, polyvinyl alcohol, polyvinyl acetate.

The refractory material may be any disclosed elsewhere herein in any combination.

In addition to oxygen liberated from the oxidizer(s), the spacers allow for atmospheric oxygen to flow more freely over the second and third surfaces, especially the one bearing the printed green ceramic composition. Further, no pressure is experienced by the printed ceramic band until the spacers are nearly decomposed and eliminated; more even heating of the green ceramic band takes place by convection over the surface that in prior art methods would be in direct contact with the opposing substrate inner surface, which is a high thermal mass substrate that is relatively cold.

Further, because contact between the non-printed substrate and the opposing substrate is delayed, the green ceramic begins to sinter and/or crystallize, thus reducing or eliminating sticking issues and enamel scratching issues. In such manner the quantity of any of anti-stick agents (such as crystallizers), binders, and vehicles can be reduced or eliminated. Reduction of organic components of the green ceramic is a clear advantage inasmuch as it reduces or eliminates the possibility of entrapment of volatilized carbon in the final fired ceramic enamel band.

In the prior art, enamel green strength binders are typically required for scratch resistance because the two glass plates rest upon the green enamel prior to firing, and can cause scratch defects even upon binder burnout. Decomposing spacers of the invention may also be used where other types of functional coatings are applied, (other than enamels) where the firing would benefit from oxygen and/or other gases adjacent to the substrates and/or enamel(s).

Method of Forming Enamel Composition Layer.

To prepare an enamel composition, a frit is ground to a fine powder using conventional methods and is combined in any order with a seed material, a pigment, optional fillers, and a vehicle. One or more enamel composition layers can be formed on the glass sheets by any suitable techniques in a desired pattern. The enamel composition layer can be applied in any suitable forms such as solution, slurry, tape, and disk. In one embodiment, the enamel composition layer is formed by screen-printing a slurry or solution of the enamel composition on the glass sheet (e.g., second surface 112). In another embodiment, the enamel composition layer is formed by decal application, brushing, roller coating, and the like.

Figure 2A:
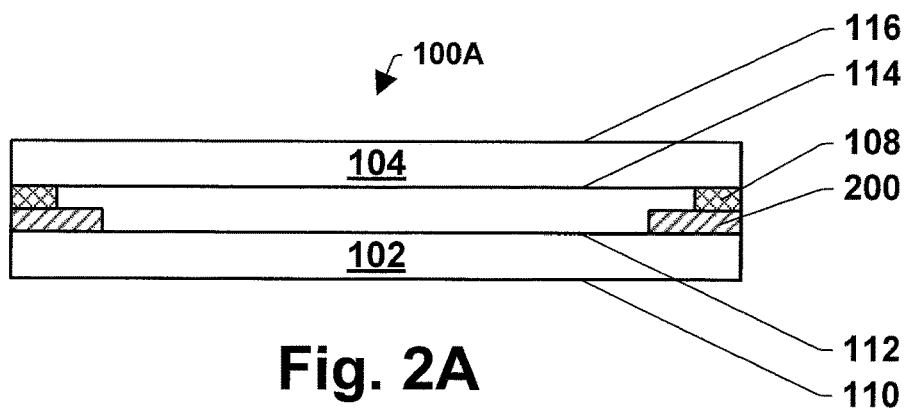
Figure 2B:
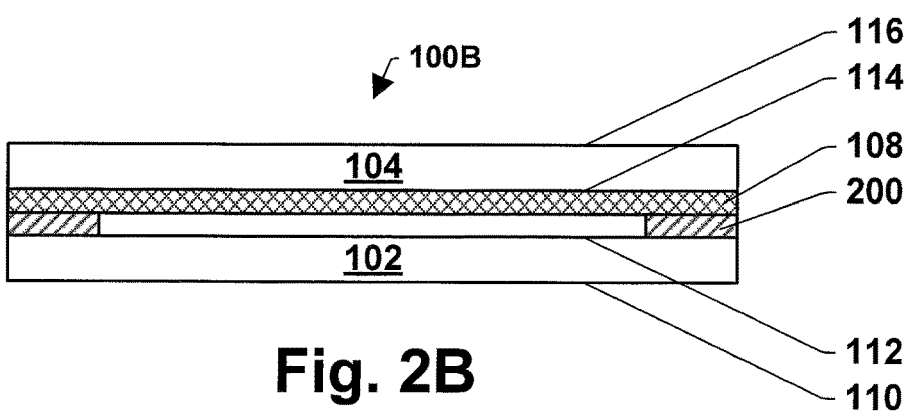
Figure 2C:
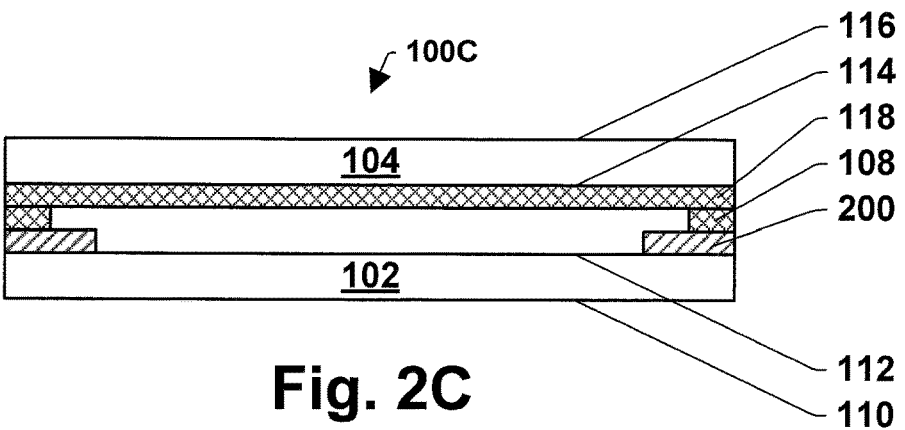

FIGS. 2A-2C illustrate firing the multilayer glass structure 100 to sinter the enamel composition layer 106 to the glass sheet (e.g., the second surface 112 of the first glass sheet 102), thereby forming a sintered enamel composition 200 on the glass sheet. The multilayer glass structure 100 can be fired at any suitable temperature as long as the enamel composition of the enamel composition layer 106 is sintered to the glass sheet. The firing temperature is generally determined by the frit maturing temperature. Typically, the firing range for the composition is about 570-680° C., more preferably about 570-650° C., and most preferably about 570-620° C. By firing, the organic vehicle of the enamel composition layer burns out and the enamel fuses to the glass sheet. The glass sheet can be colored or decorated by applying the pigment-containing enamel composition to at least one surface of the glass sheet and firing the glass sheet.

After firing the multilayer glass structure 100, the multilayer glass structure 100, one now having the sintered enamel composition 200, are separated from the mold and from one another, whereby they (e.g., the first and second glass sheets 102, 104) do not stick to the mold or to one another. The glass sheets do not stick to one another because the multilayer glass structure includes at least one separation layer between the first and second glass sheets. It is advantageous at that the sheets, after firing, do not stick to one another because they are often further processed to make a laminated (safety glass) windshield, for example. In such case, a laminating film such as polyvinyl butyral (PVB) is inserted between the glass sheets, and the sheets and PVB are heated to fuse them together. Were the sheets to stick to one another after the above-mentioned firing step, the further processing may be frustrated or impossible, and mechanical and/or optical defects can occur.

Figure 3A:
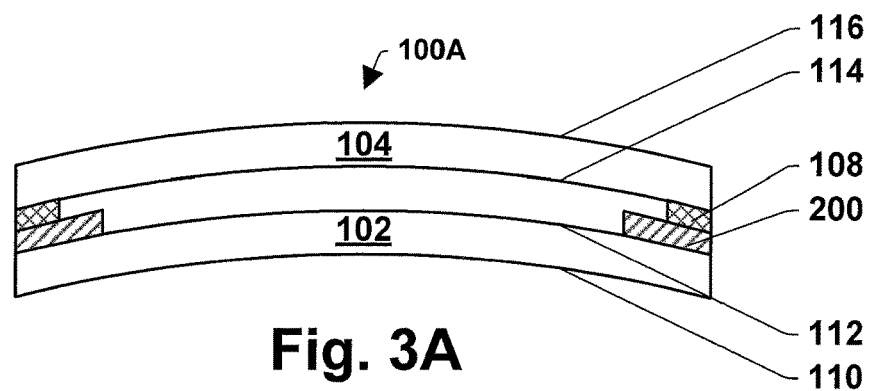
Figure 3B:
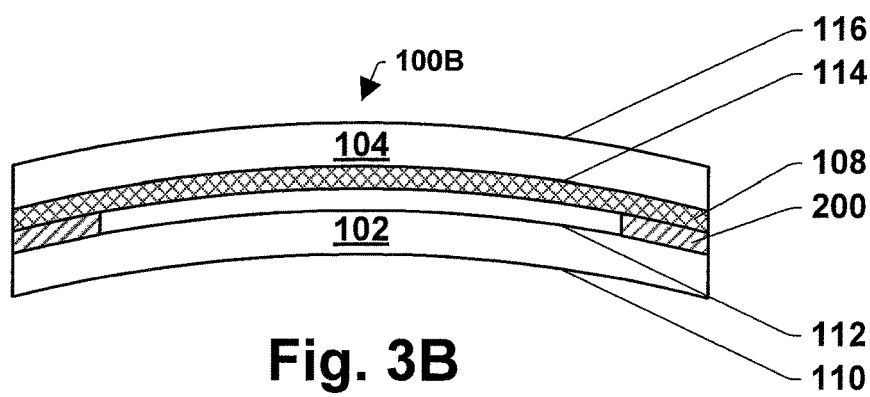
Figure 3C:
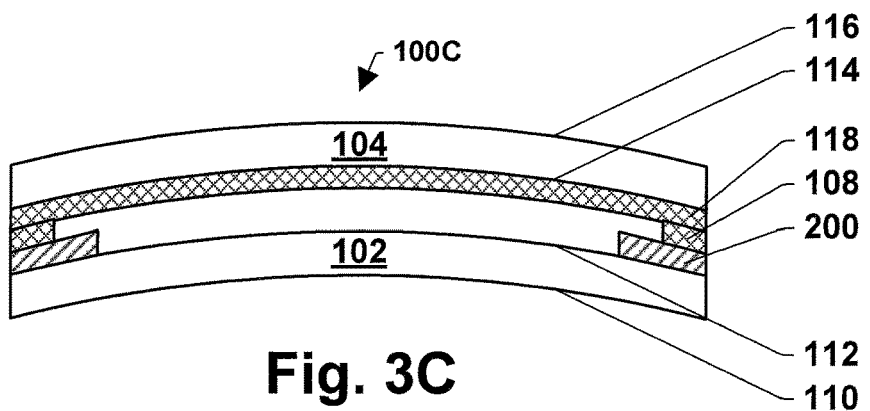

FIGS. 3A-3C illustrate bending the multilayer glass structure 100. In one embodiment, the method involves bending the multilayer glass structure 100 after or during firing the multilayer glass structure 100. The multilayer glass structure 100 can be bent by any suitable techniques. In one embodiment, the heated multilayer glass structure 100 is subjected to a forming pressure, e.g., gravity sag or press bending in the range of 0.1 to 5 psi, typically about 2 psi, with a forming die. While FIGS. 3A-3C illustrate bending the multilayer glass structure 100 so that the multilayer glass structure 100 bends towards the second glass sheet 104 for the purpose of brevity, the multilayer glass structure 100 can be bent so that the multilayer glass structure 100 bends towards the first glass sheet 102. In another embodiment, the method does not involve bending the multilayer glass structure 100 after or during firing the multilayer glass structure 100.

Figure 4:
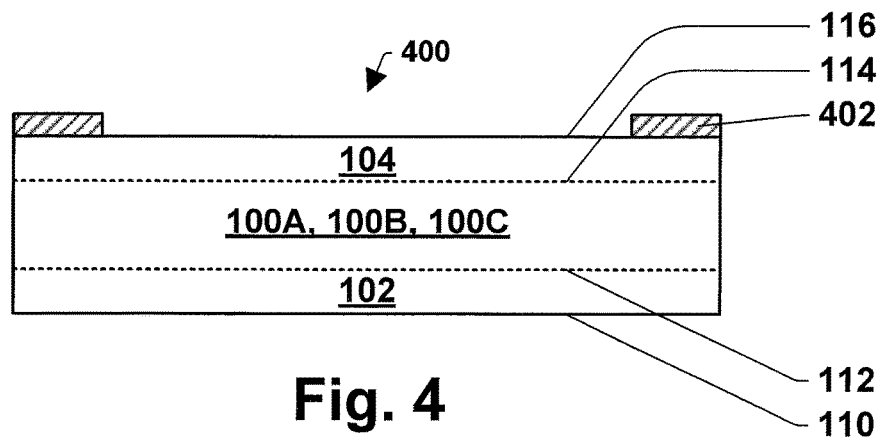
FIGS. 4-6 are a process flow diagram schematically illustrating a process of making a multilayer glass structure in accordance with one aspect of the subject invention.
Figure 5:
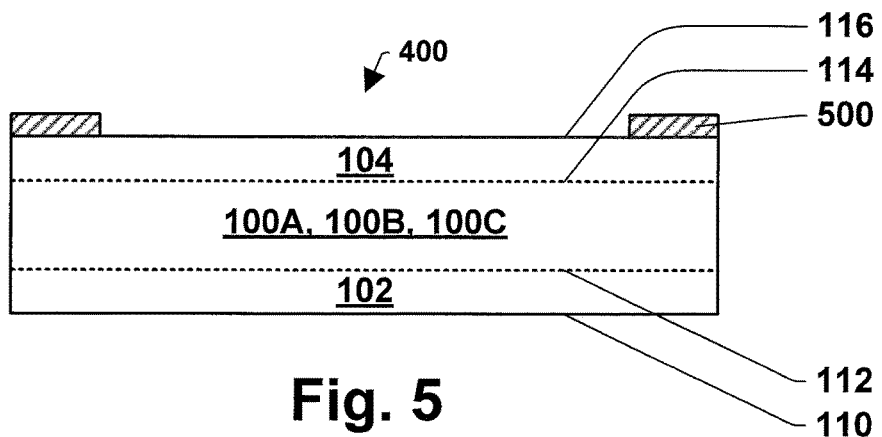
Figure 6:
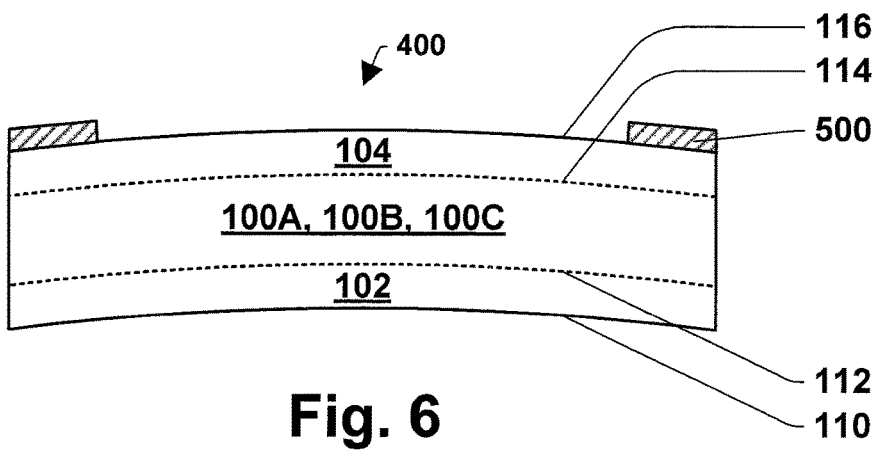
Figure 7A:
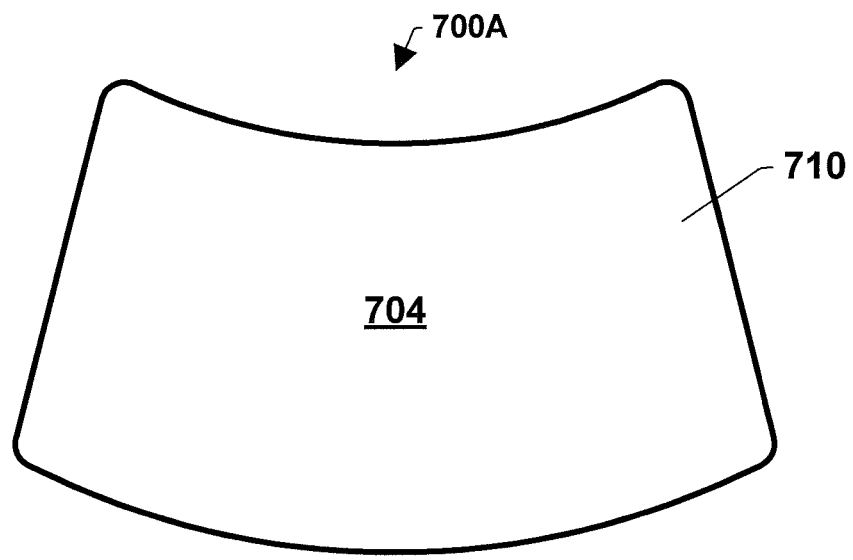
FIGS. 7-10 are a process flow diagram schematically illustrating a process of making a multilayer glass structure in accordance with another aspect of the subject invention.
Figure 7B:
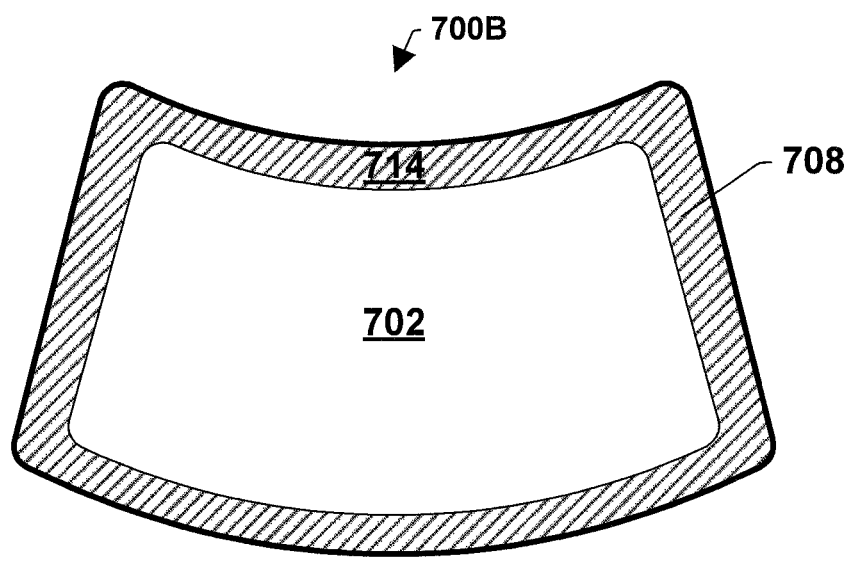

Referring to FIGS. 4-6, one of many possible exemplary embodiments of making multilayer glass structure 400 is illustrated. FIG. 4 schematically illustrate providing a multilayer glass structure 100A, 100B, or 100C as described in connection with FIGS. 1A-1C. The multilayer glass structure 100A, 100B, or 100C includes a first glass sheet 102 and a second glass sheet 104, and a first enamel composition layer 106 and one or more separation layers 108, 118 between the first and second glass sheets as described in connection with FIGS. 1A-1C. FIG. 4 (unfired condition) further illustrates a second enamel composition layer 402 on the fourth surface 116 of the second glass sheet 104. The second enamel composition layer 402 can be formed on the fourth surface 116 in the same manner as described in connection with the first enamel composition layer 106 in FIGS. 1A-1C.

FIG. 5 illustrates subjecting the multilayer glass structure 400 to a firing operation. The multilayer glass structure 400 can be placed in a mold and fired at a temperature sufficient to sinter the enamel 402 and fuse it to the second glass substrate 116 in the same manner as described in connection with the multilayer glass structure 100 in FIGS. 2A-2C. The second glass sheet bears a sintered enamel composition 500. Since the multilayer glass structure 400 includes the separation layer 108, 118, the glass sheets 102, 104 do not stick to one another. In one embodiment, the first enamel composition layer 106 can be sintered to the first glass sheet 102 at the same time when the second enamel composition layer 402 is sintered to the second glass sheet 104.

FIG. 6 illustrates bending the multilayer glass structure 400. In one embodiment, the multilayer glass structure 400 is bent in the same manner as described in connection with the glass structure 100 in FIGS. 3A-3C.

Referring to FIGS. 7-10, one of many possible exemplary embodiments of making multilayer glass structure 700 (i.e., 700A and 700B) is illustrated. FIGS. 7A and 7B schematically illustrate providing a second glass sheet 704 and a first glass sheet 702, respectively. The first glass sheet 702 has a first surface (706, not shown) and a second surface 708. The second glass sheet 704 has a third surface 710 and a fourth surface (712, not shown). FIG. 7B further illustrates forming an enamel composition layer 714 as described in connection with the enamel composition layer 106 in FIG. 1A. Although not shown in FIG. 7A, the fourth surface of the second glass sheet can have a second enamel composition layer as described in connection with the second enamel composition 402 in FIG. 4.

In one embodiment, the first enamel composition layer 714 and/or the second enamel composition layer are formed on the periphery of the glass sheet. The enamel composition layer can have any suitable width depending on the desired implementations of the multilayer glass structure 700 being fabricated. In one embodiment, the enamel composition layer has about 1 mm or more and about 100 mm or less of width. In another embodiment, the enamel composition layer has about 2 mm or more and about 50 mm or less of width. In yet another embodiment, the enamel composition layer has about 5 mm or more and about 30 mm or less of width.

Figure 8A:
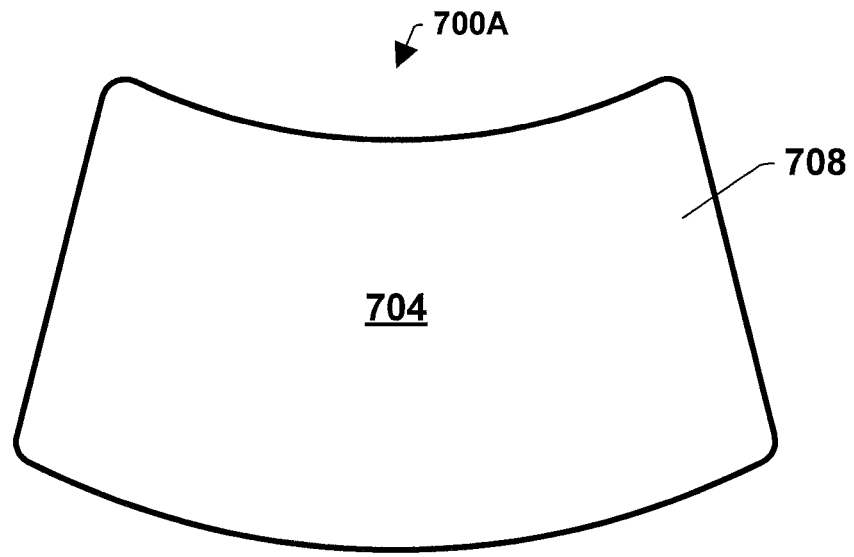
Figure 8B:
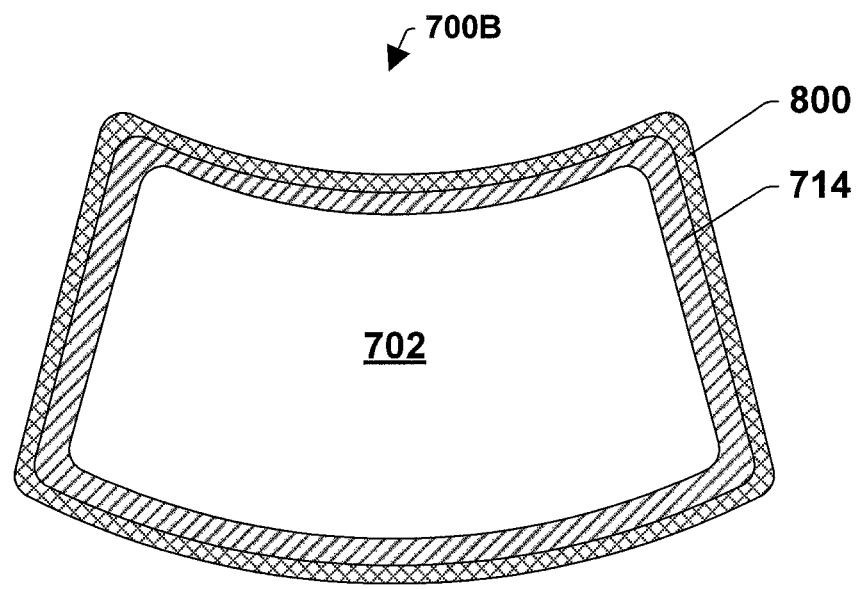

FIGS. 8A and 8B illustrate forming a separation layer 800 on the first enamel composition layer 714. The separation layer 800 can be formed on the first enamel composition layer 714 as described in connection with separation layer 108 in FIG. 1A. The separation layer is selected from a group consisting of a black pigment separation layer, a refractory material separation layer, and an oxidizer separation layer. The separation layer 800 can be a black pigment separation layer or a refractory material separation layer.

The separation layer 800 can have any suitable width depending on the desired implementations of the multilayer glass structure 700 being fabricated. In one embodiment, the separation layer 800 has about 1 mm or more and about 100 mm or less of width. In another embodiment, the enamel composition layer has about 2 mm or more and about 50 mm or less of width. In yet another embodiment, the enamel composition layer has about 5 mm or more and about 30 mm or less of width. In still yet another embodiment, the width of the separation layer 800 is equal to or smaller than the width of the first enamel composition layer 714.

Figure 9:
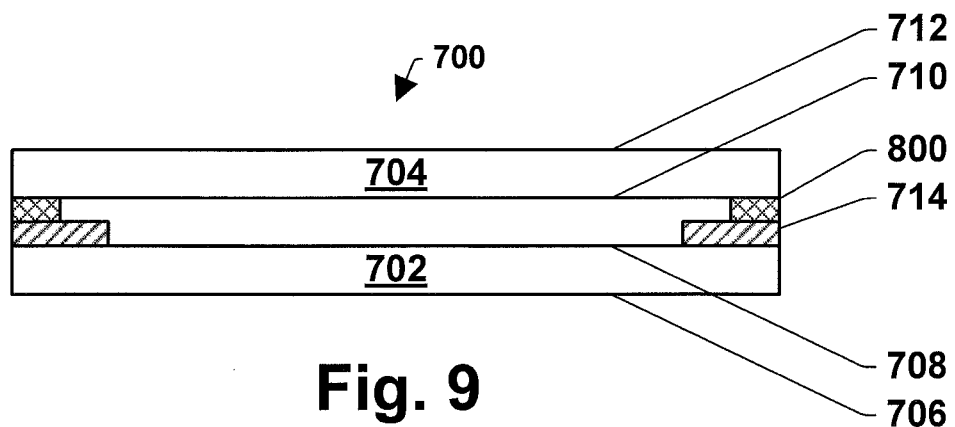

FIG. 9 illustrates stacking the second glass sheet 704 with the first glass sheet 702 to form the multilayer glass structure 700 so that the enamel composition layer 714 and the separation layer 800 lie between the first and second glass sheets. In particular, FIG. 9 shows a cross-sectional view of the stacked substrates.

Figure 10:
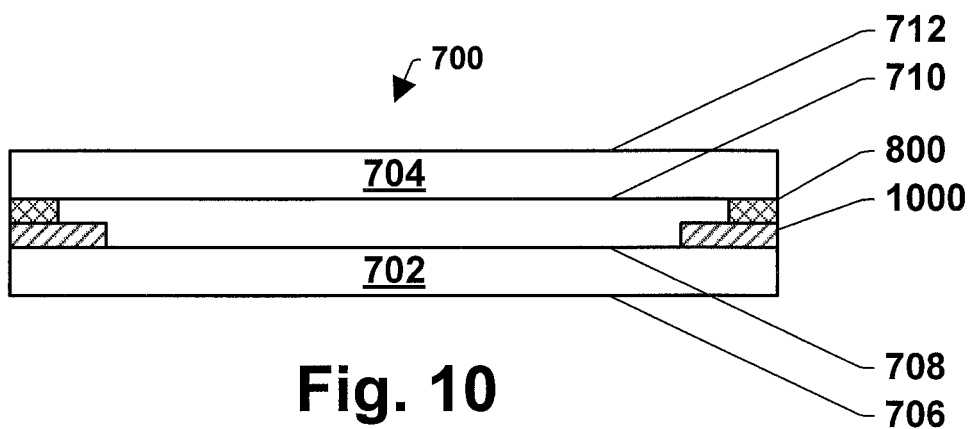

FIG. 10 illustrates subjecting the multilayer glass structure 700 to a firing operation. The multilayer glass structure 700 can be placed in a mold and fired at a temperature sufficient to sinter the enamel and fuse it to the first glass substrate. The first glass substrate bears a sintered enamel composition 1000. Since the multilayer glass structure 700 includes the separation layer 800, the glass sheets 702, 704 do not stick to one another. Although not shown in FIGS. 7-10, the multilayer glass structure 700 can have a second enamel composition layer, for example, on the fourth surface 712 of the second glass sheet 704.

Figure 11A:
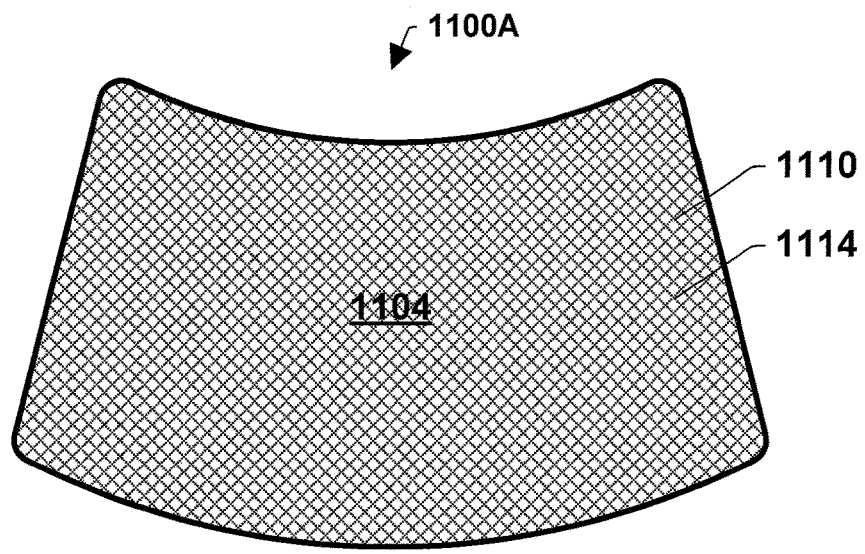
FIGS. 11-13 are a process flow diagram schematically illustrating a process of making a multilayer glass structure in accordance with yet another aspect of the subject invention.
Figure 11B:
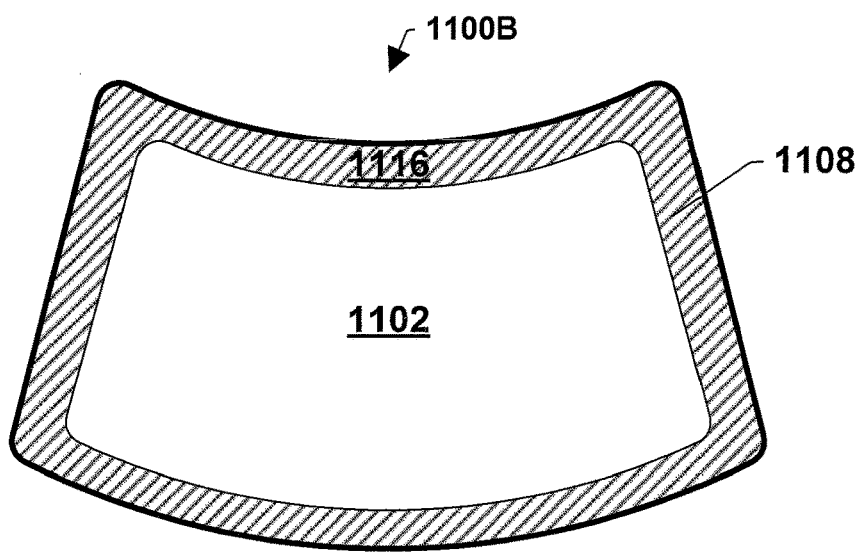
Figure 12:
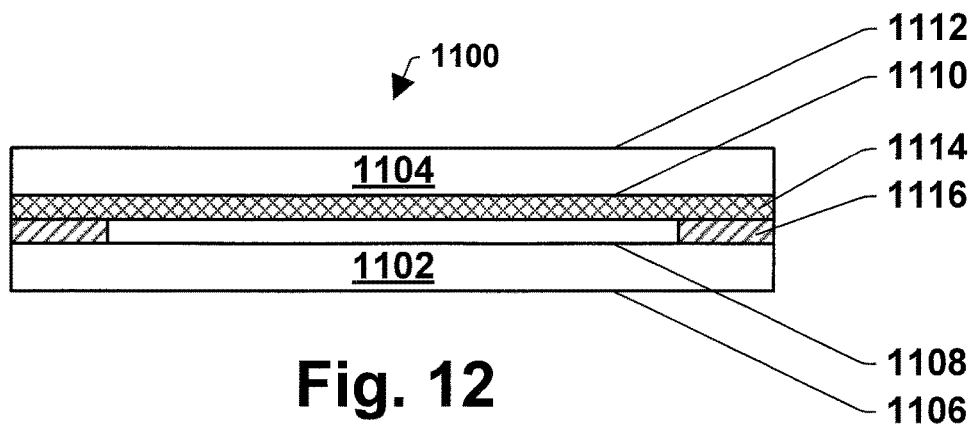
Figure 13:
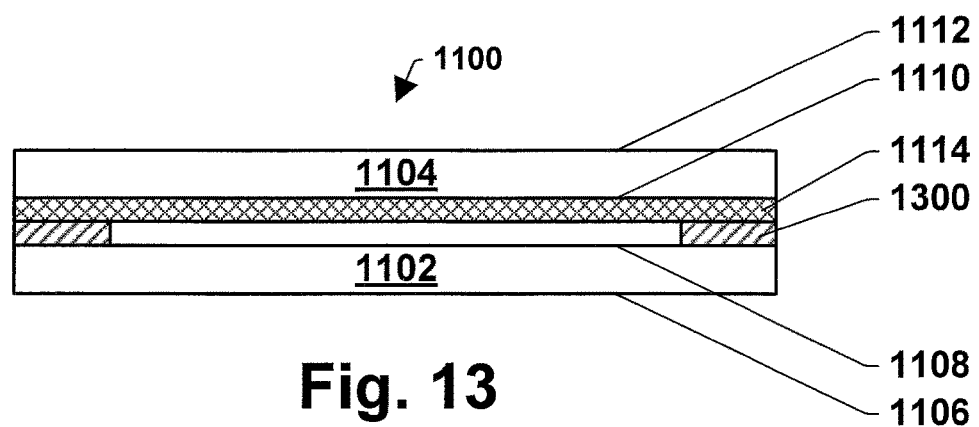

Referring to FIGS. 11-13, one of many possible exemplary embodiments of making multilayer glass structure 1100 (i.e., 1100A and 1100B) is illustrated. FIGS. 11A and 11B schematically illustrate providing a second glass sheet 1104 and a first glass sheet 1102, respectively. The first glass sheet 1102 has a first surface (1106, not shown) and a second surface 1108. The second glass sheet 1104 has a third surface 1110 and a fourth surface (1112, not shown). FIG. 11A further illustrates forming a separation layer 1114 on the third surface 1110 of the second glass sheet as described in connection with the separation layer 108 in FIG. 1B. In this example, the separation layer 1114 is formed on the entire surface of the third surface 1110. FIG. 11B further illustrates forming an enamel composition layer 1116 as described in connection with the enamel composition layer 106 in FIG. 1B. Although not shown in FIG. 11A, the fourth surface of the second glass sheet can have a second enamel composition layer as described in connection with the second enamel composition layer 402 in FIG. 4.

FIG. 12 illustrates stacking the second glass sheet 1104 with the first glass sheet 1102 to form the multilayer glass structure 1100 so that the separation layer 1114 and the enamel composition layer 1116 lie between the first and second glass sheets. In particular, FIG. 12 shows a cross-sectional view of the stacked substrates.

FIG. 13 illustrates subjecting the multilayer glass structure 1100 to a firing operation. The multilayer glass structure 1100 can be placed in a mold and fired at a temperature sufficient to sinter the enamel and fuse it to the first glass substrate. The first glass substrate bears a sintered enamel composition 1300. Since the multilayer glass structure 1100 includes the separation layer 1114, the glass sheets 1102, 1104 do not stick to one another. Although a second enamel composition layer is not shown in FIGS. 11-13, the multilayer glass structure 1100 can have a second enamel composition layer, for example, on the fourth surface 1112 of the second glass sheet 1104.

Figure 14A:
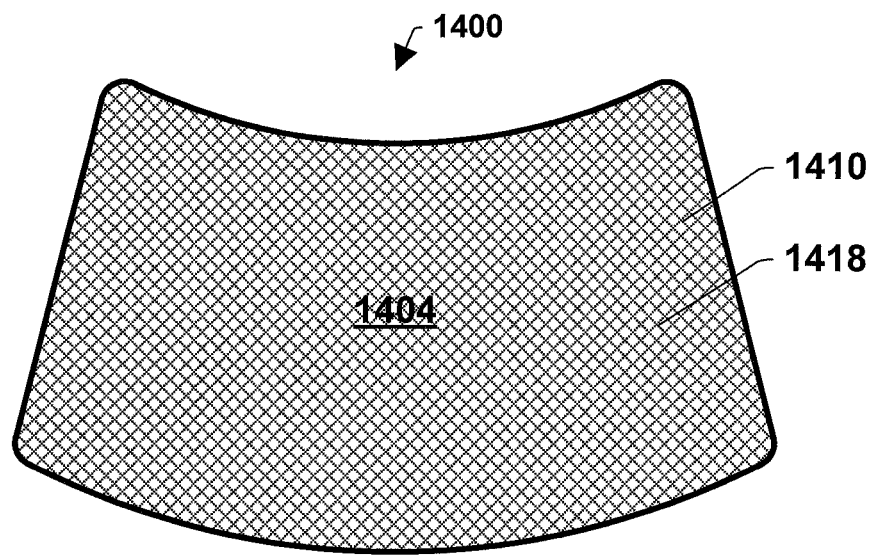
FIGS. 14-16 are a process flow diagram schematically illustrating a process of making a multilayer glass structure in accordance with still yet another aspect of the subject invention.
Figure 14B:
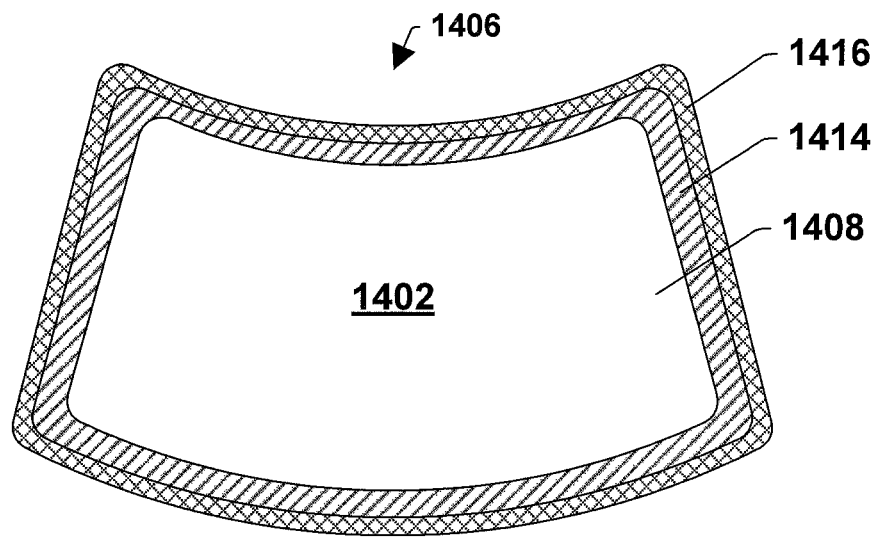
Figure 15:
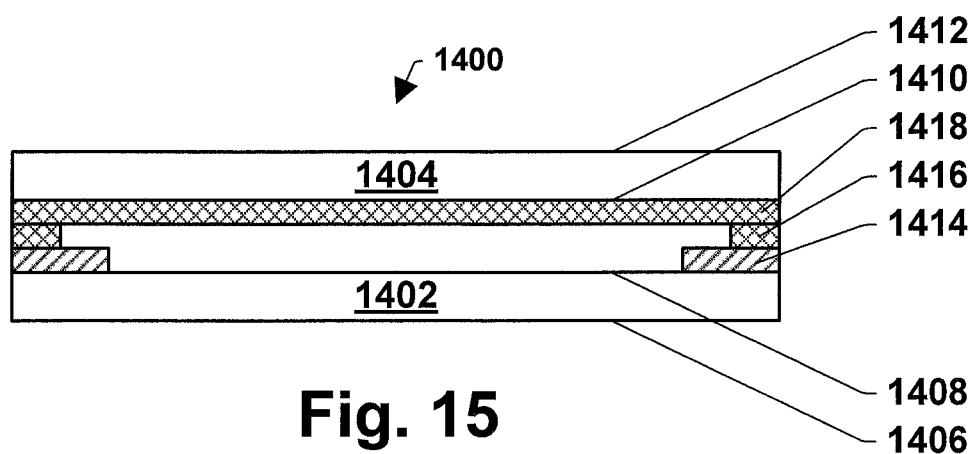
Figure 16:
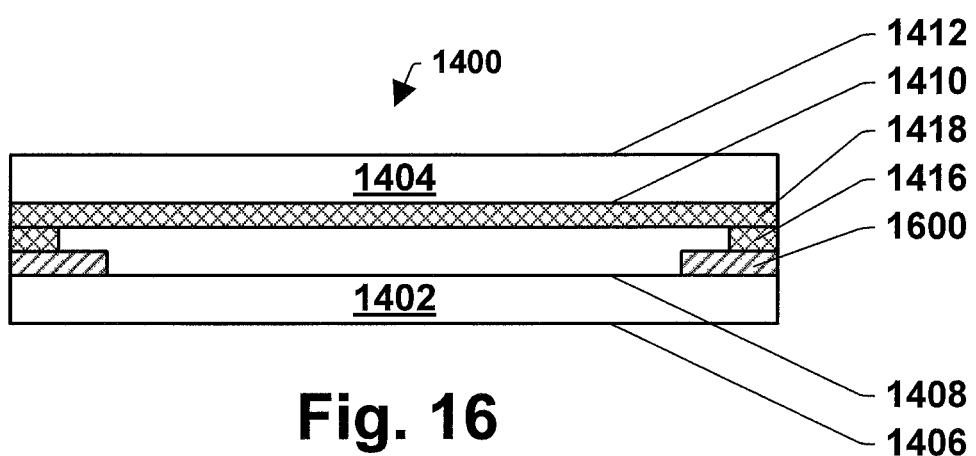

Referring to FIGS. 14-16, one of many possible exemplary embodiments of making multilayer glass structure 1400 (i.e., 1400A and 1400B) is illustrated. FIGS. 14A and 14B schematically illustrate providing a second glass sheet 1404 and a first glass sheet 1402, respectively. The first glass sheet 1402 has a first surface (1406, not shown) and a second surface 1408. The second glass sheet 1404 has a third surface 1410 and a fourth surface (1412, not shown). FIG. 14B further illustrates forming an enamel composition layer 1414 as described in connection with the enamel composition layer 106 in FIG. 1C and forming a first separation layer 1416 on the enamel composition layer 1414 as described in connection with the first separation layer 108 in FIG. 1C. FIG. 14A illustrates forming a second separation layer 1418 on the third surface 1410 of the second glass sheet 1404 as described in connection with the second separation layer 118 in FIG. 1C. In this example, the separation layer 1418 is formed on the entire surface of the third surface 1410. Although not shown in FIG. 14A, the fourth surface of the second glass sheet can have a second enamel composition layer as described in connection with the second enamel composition layer 402 in FIG. 4.

FIG. 15 illustrates stacking the second glass sheet 1404 with the first glass sheet 1402 to form the multilayer glass structure 1400 so that the first and second separation layers 1416, 1418 and the enamel composition layer 1414 lie between the first and second glass sheets. FIG. 15 shows a cross-sectional view of the stacked substrates.

FIG. 16 illustrates subjecting the multilayer glass structure 1400 to a firing operation. The multilayer glass structure 1400 can be placed in a mold and fired at a temperature sufficient to sinter the enamel and fuse it to the first glass substrate. The first glass substrate bears a sintered enamel composition 1600. Since the multilayer glass structure 1400 includes the first and second separation layers 1416, 1418, the glass sheets 1402, 1404 do not stick to one another. Although a second enamel composition layer is not shown in FIGS. 14-16, the multilayer glass structure 1400 can have a second enamel composition layer, for example, on the fourth surface 1412 of the second glass sheet 1404.

Referring to FIGS. 17-18, one of many possible exemplary embodiments of making multilayer glass structure 1700 is illustrated.

Figure 17A:
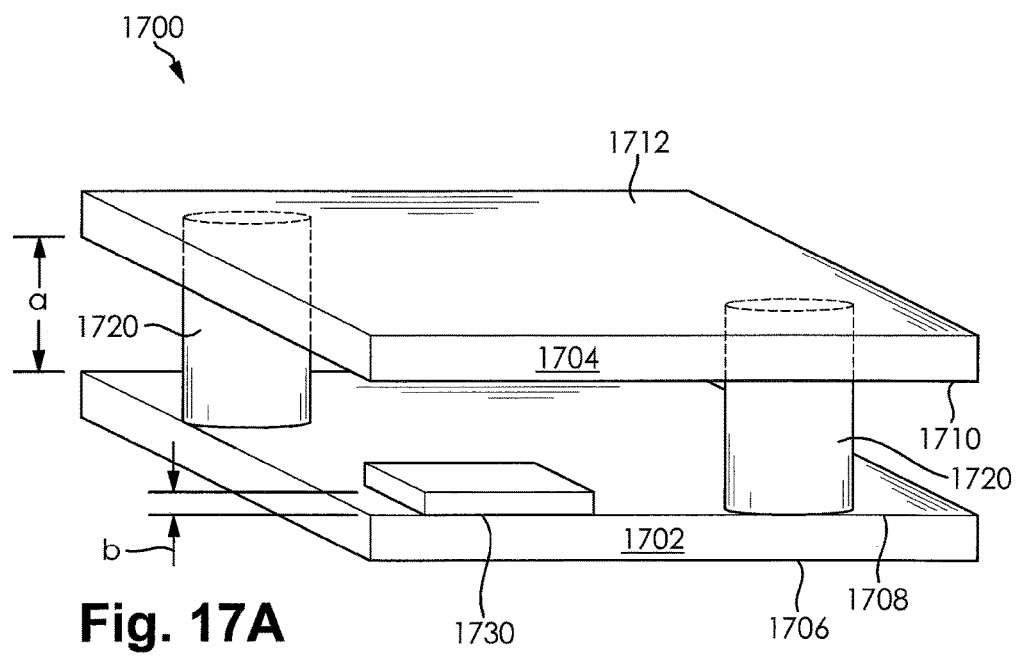
FIGS. 17-18 depict spacer materials used in forming a multilayer glass structure in accordance with an aspect of the invention.
Figure 17B:
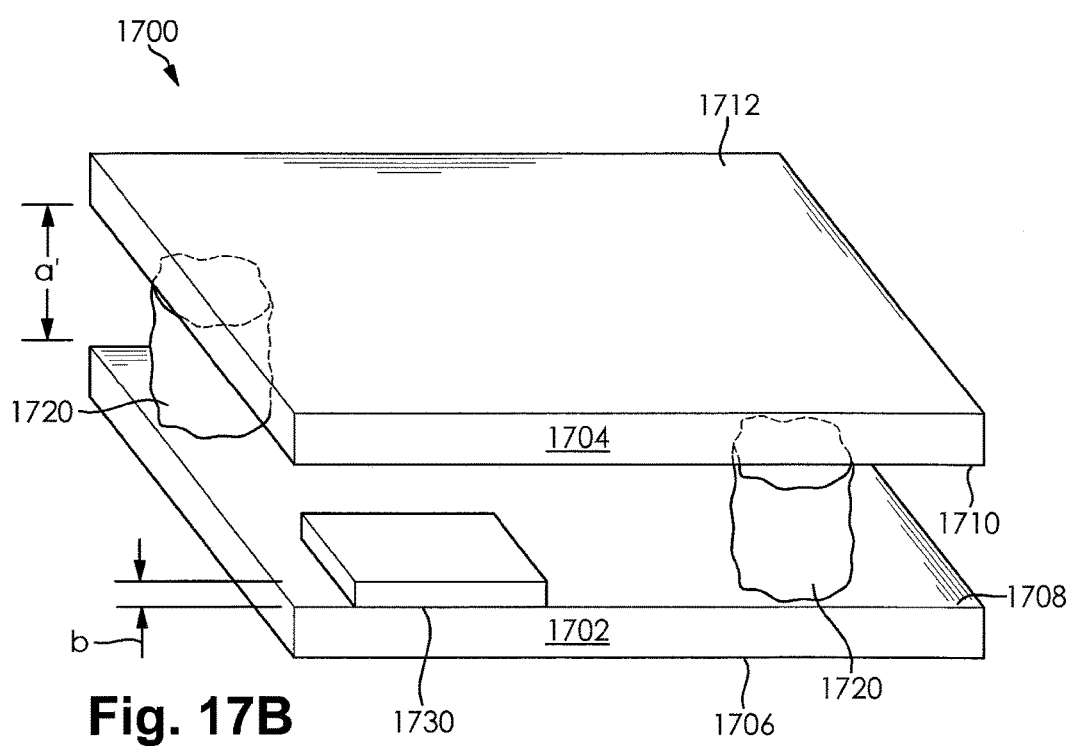
Figure 17C:
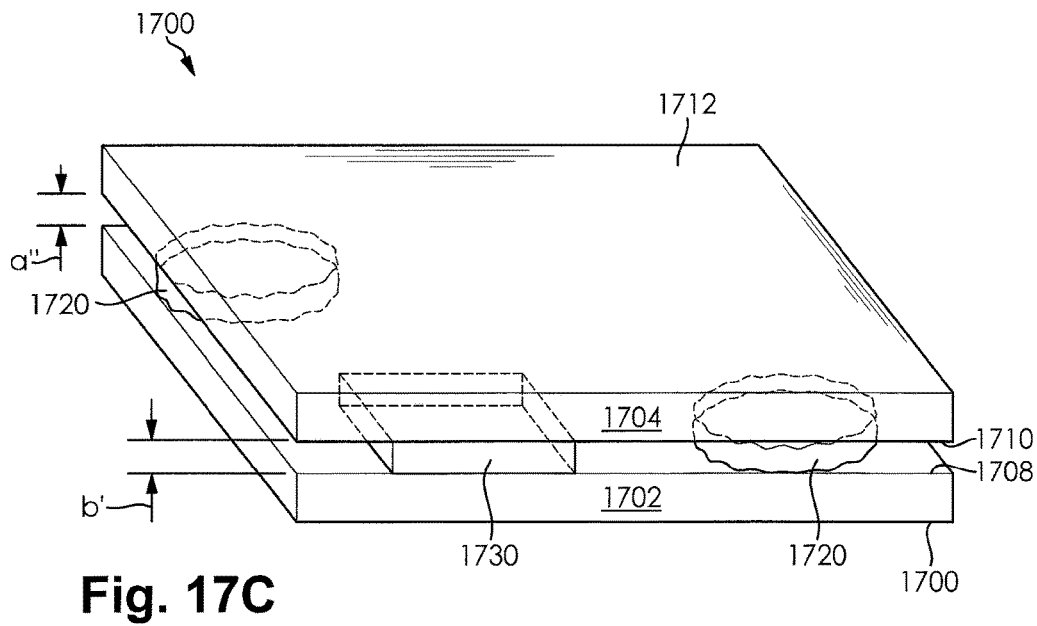

FIGS. 17A, 17B, and 17C schematically illustrate providing a second glass sheet 1704 and a first glass sheet 1702, respectively. FIGS. 17A, 17B, 17C and 17D show successive stages of decomposition of a decomposable spacer as the assembly 1700 is heated. The first glass sheet 1702 has a first surface 1706 and a second surface 1708. The second glass sheet 1704 has a third surface 1710 and a fourth surface 1712. At least one decomposable spacer 1720 lies between first and second glass sheets 1702 and 1704. Additionally, enamel composition 1730 is applied to the first glass sheet 1702. Enamel composition 1730 can be applied in any desired configuration; only a portion is shown in the Figures. Spacers 1720 serve to separate glass sheets 1702 and 1704 and may contain useful compositions such as oxidizers and/or other components as disclosed elsewhere herein. One can see by the transition from FIGS. 17A to 17B to 17C to 17D that spacers 1720 begin to decompose and flatten and finally fully decompose (i.e., volatilize) thereby allowing glass sheets 1702 and 1704 to move closer together. The spacers allow free air to pass between substrates 1702 and 1704. Improved convection is possible thereby quickly and evenly heating enamel 1730.

Figure 17D:
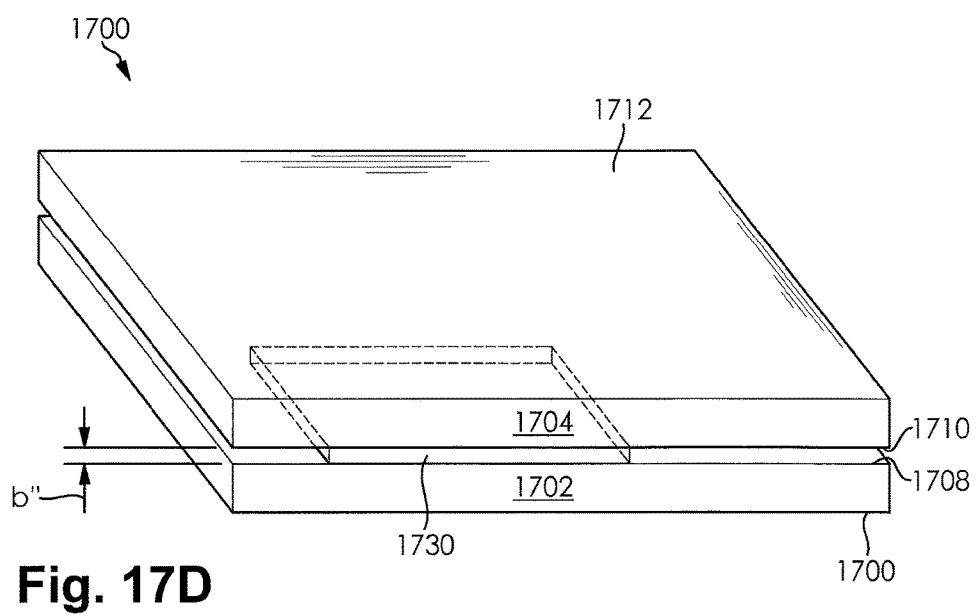

FIG. 17B further illustrates forming an enamel composition layer 1730 and forming spacers 1720 between glass panels 1702 and 1706. Spacers 1720 have initial thickness a in FIG. 17A, which is thicker than the original thickness of applied enamel (thickness b) composition layer 1730. In FIG. 17B, spacers 1720 have a thickness a' which is thinner than thickness a, meaning that spacers 1720 have begun to decompose, but enamel 1730 has not yet heated sufficiently to begin to sinter. In FIG. 17C, spacers 1720 have thickness a" which is thinner than a' and is the same as the thickness (b') of the enamel composition 1730. Thickness b' is thinner than thickness b in FIG. 17B, meaning that enamel 1730 has started to sinter in FIG. 17C. It is also possible that spacers 1720 have essentially fully decomposed before enamel 1730 begins to sinter as depicted in FIG. 17D, which lacks items 1720. Final stages of decomposition of spacers 1720 may take place just as enamel 1730 begins to sinter. IN FIG. 17D, thickness b" of enamel 1730 may be the same as thickness b' or b" may be thinner than b'.

Figure 18A:
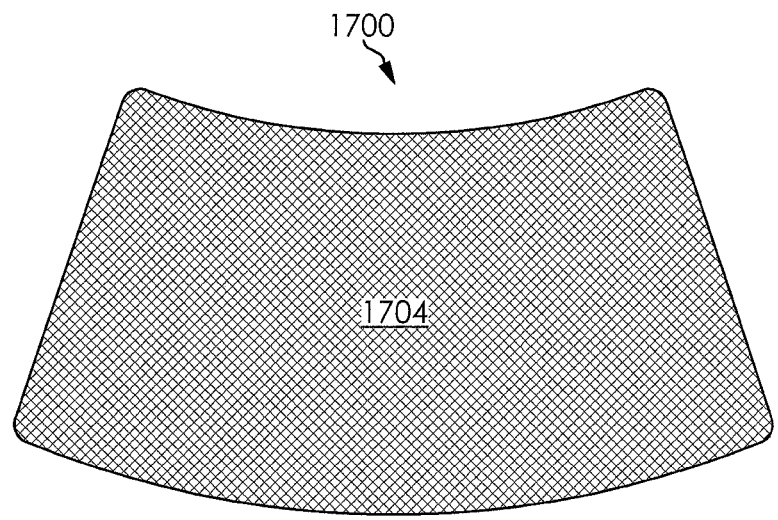
Figure 18B:
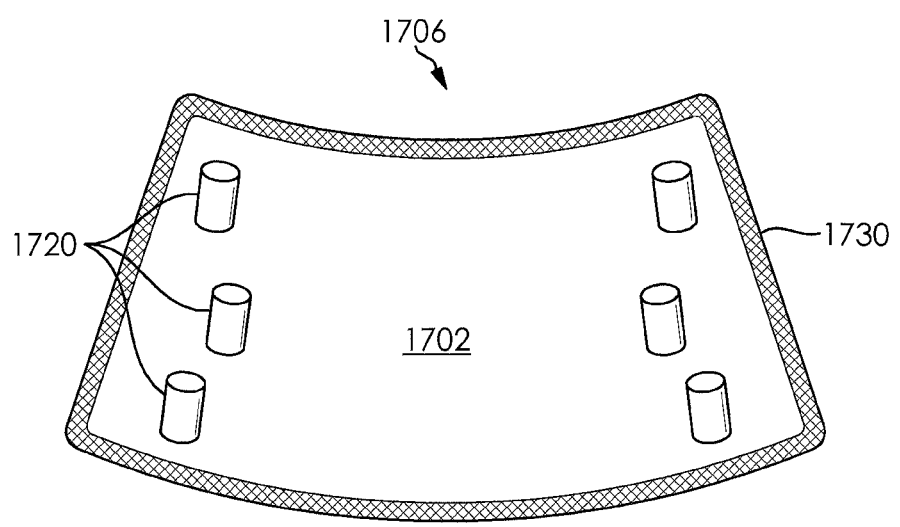

FIGS. 18A and 18B show an exploded view of the situation from FIG. 17 as applied to a curved windshield, prior to any heating, with like parts represented by like reference numbers. FIGS. 18A and 18B show glass sheets 1704 and 1702 with spacers 1720 positioned on glass sheet 1702. Enamel 1730 has been applied to glass sheet 1702.

Experimental Examples

The following examples illustrate the subject invention. Unless otherwise indicated in the following examples and elsewhere in the specification and claims, all parts and percentages are by weight, all temperatures are in degrees Celsius, and pressure is at or near atmospheric pressure.

Black Pigment Separation Layer.

The black spinel pigment, bismuth silicate, Bentone 34, DI water, ammonium nitrate, and zinc oxide, as presented in Table 9, are weighed and mixed together in a blender, and compositions of black pigment separation layers are formed in a slurry form.

TABLE 9

Black pigment separation layer compositions (weight %).

| Example | 1 | 2 | 3 | 4 | 5 |
|---|---|---|---|---|---|
| Copper chromite black spinel (C.I. Pigment Black 28, CAS # 68186-91-4) | 47 | 47 | 45 | 45 | 47 |
| Bismuth silicate | 0 | 0 | 2 | 2 | 0 |
| Bentone 34 | 0.12 | 0.12 | 0.12 | 0.12 | 0.12 |
| DI water | 52.88 | 49.88 | 52.88 | 49.88 | 52.38 |
| Ammonium nitrate | 0 | 3 | 0 | 3 | 0 |
| Zinc oxide | 0 | 0 | 0 | 0 | 0.50 |

Refractory Material Separation Layer.

Zirconium silicate, aluminium oxide, bismuth silicate, zinc silicate, DI water, Bentone 34, and ammonium nitrate, as presented in Table 10, are weighed and mixed together in a blender, and compositions of refractory material separation layers are formed in a slurry form.

TABLE 10

Refractory material separation layer compositions (weight %).

| Example | 6 | 7 | 8 | 9 |
|---|---|---|---|---|
| Zirconium silicate | 45 | 0 | 0 | 0 |
| Aluminium oxide | 0 | 42 | 0 | 0 |
| Bismuth silicate | 0 | 0 | 60 | 0 |
| Zinc silicate | 0 | 0 | 0 | 40 |
| DI water | 53.88 | 57.88 | 39.88 | 58.88 |
| Bentone 34 | 0.12 | 0.12 | 0.15 | 0.12 |
| Ammonium nitrate | 1 | 0 | 0 | 1 |

Oxidizer Separation Layer.

DI water, ammonium nitrate, diatomaceous earth, and talc, as presented in Table 11, are weighed and mixed together in a blender, and compositions of refractory material separation layers are formed in a slurry form.

TABLE 11

Oxidizer separation layer compositions (weight %).

| example | 10 | 11 | 12 |
|---|---|---|---|
| DI water | 95 | 92 | 92 |
| ammonium nitrate | 5 | 5 | 5 |
| diatomaceous earth | 0 | 3 | 0 |
| Talc | 0 | 0 | 3 |

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain,' "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain," "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim. All compositional percentages are by weight and are given for a blend prior to firing unless otherwise indicated. All percentages, temperatures, times, particle sizes and ranges of other values are presumed to be accompanied by the modifier "about."

What is claimed is:

1. A method of making multilayer glass structure, comprising:
   providing first and second glass sheets, an enamel composition layer and at least one decomposable spacer between the first and second glass sheets; and
   firing the first and second glass sheets to sinter the enamel composition to the first glass sheet,
   wherein said at least one decomposable spacer is fully decomposed during the sintering the enamel composition to the first glass sheet.

2. The method of claim 1, wherein the enamel composition layer is a first enamel composition layer, the method further comprising forming a second enamel composition layer on the second glass sheet and firing the second glass sheet to sinter the second enamel composition to the second glass sheet.

3. The method of claim 1, further comprising bending the multilayer glass structure by subjecting the multilayer glass structure to a forming pressure.

4. The method of claim 1, wherein said at least one decomposable spacer is not in direct contact with the enamel composition layer.

5. The method of claim 1, wherein said at least one decomposable spacer comprises binder selected from the group consisting of methyl cellulose, ethyl cellulose, and hydroxypropyl cellulose, ethyl hydroxyethyl cellulose, wood rosin, mixtures of ethyl cellulose and phenolic resins, polymethacrylates of lower alcohols and the monobutyl ether of ethylene glycol monoacetate, polyvinyl butanol, polyvinyl alcohol, and polyvinyl acetate.

6. The method of claim 1, wherein said at least one decomposable spacer comprises oxidizer selected from the group consisting of ammonium nitrate, antimony pentoxide, barium nitrate, bismuth pentoxide, bismuth subnitrate, bismuth tetroxide, calcium nitrate, calcium peroxide, cesium nitrate, cobalt nitrate, copper nitrate, lithium nitrate, magnesium peroxide, manganese dioxide, nickel (III) oxide, platinum dioxide, potassium bromate, potassium chlorate, potassium iodate, potassium nitrate, potassium nitrite, potassium peroxide, silver nitrate, sodium bromate, sodium chlorate, sodium nitrate, sodium nitrite, sodium percarbonate, sodium peroxide, strontium nitrate, strontium poroxide, tellurium trioxide, tin nitrate, and zinc peroxide.

7. A method of making multilayer glass structure, comprising:
   forming an enamel composition layer on a first glass sheet;
   forming at least one decomposable spacer positioned between the first and second glass sheets;

stacking the second glass sheet with the first glass sheet wherein the enamel composition layer and said at least one decomposable spacer lies between the first and second glass sheets; and heating the stacked glass sheets to fuse the enamel composition to the first glass sheet and said at least one decomposable spacer is fully decomposed and liberates oxygen during the decomposition.

8. The method of claim 7, wherein the enamel composition layer is a first enamel composition layer, the method further comprising forming a second enamel composition layer on the second glass sheet and firing the second glass sheet to sinter the second enamel composition to the second glass sheet.

9. The method of claim 7, further comprising bending the multilayer glass structure by subjecting the multilayer glass structure to a forming pressure.

10. The method of claim 4, wherein said at least one decomposable spacer is not in direct contact with the enamel composition layer.

11. The method of claim 4, wherein said at least one decomposable spacer comprises binder selected from the group consisting of methyl cellulose, ethyl cellulose, and hydroxypropyl cellulose, ethyl hydroxyethyl cellulose, wood rosin, mixtures of ethyl cellulose and phenolic resins, polymethacrylates of lower alcohols and the monobutyl ether of ethylene glycol monoacetate, polyvinyl butanol, polyvinyl alcohol, and polyvinyl acetate.

12. The method of claim 4, wherein said at least one decomposable spacer comprises oxidizer selected from the group consisting of ammonium nitrate, antimony pentoxide, barium nitrate, bismuth pentoxide, bismuth subnitrate, bismuth tetroxide, calcium nitrate, calcium peroxide, cesium nitrate, cobalt nitrate, copper nitrate, lithium nitrate, magnesium peroxide, manganese dioxide, nickel (III) oxide, platinum dioxide, potassium bromate, potassium chlorate, potassium iodate, potassium nitrate, potassium nitrite, potassium peroxide, silver nitrate, sodium bromate, sodium chlorate, sodium nitrate, sodium nitrite, sodium percarbonate, sodium peroxide, strontium nitrate, strontium peroxide, tellurium trioxide, tin nitrate, and zinc peroxide.

13. A method of making a multilayer glass structure, comprising:

(a) providing first and second glass sheets, (b) providing an enamel composition layer on the first glass sheet and between the first and second glass sheets, (c) providing at least one decomposable spacer between the first and second glass sheets, the decomposable spacer having a thickness that is thicker than a thickness of the enamel composition layer and thereby prevents the enamel composition from contacting the second glass sheet, (d) firing the glass sheets to decompose the decomposable spacer so that the decomposable spacer experiences a reduction in thickness so that the enamel composition layer contacts the first and second glass sheets, and to sinter the enamel composition to the first glass sheet, wherein the at least one decomposable spacer includes at least one material selected from the group consisting of a wax, methyl cellulose, ethyl cellulose, and hydroxypropyl cellulose, ethyl hydroxyethyl cellulose, wood rosin, mixtures of ethyl cellulose and phenolic resins, polymethacrylates of lower alcohols and the monobutyl ether of ethylene glycol monoacetate, polyvinyl butanol, polyvinyl alcohol, and polyvinyl acetate, and wherein the at least one decomposable spacer fully decomposes during the firing the glass sheets.

14. The method of claim 13, wherein said at least one spacer is not in direct contact with the enamel composition layer.

15. The method of claim 13, wherein said at least one decomposable spacer further comprises oxidizer selected from the group consisting of ammonium nitrate, antimony pentoxide, barium nitrate, bismuth pentoxide, bismuth subnitrate, bismuth tetroxide, calcium nitrate, calcium peroxide, cesium nitrate, cobalt nitrate, copper nitrate, lithium nitrate, magnesium peroxide, manganese dioxide, nickel (III) oxide, platimum dioxide, potassium bromate, potassium chlorate, potassium iodate, potassium nitrate, potassium nitrite, potassium peroxide, silver nitrate, sodium bromate, sodium chlorate, sodium nitrate, sodium nitrite, sodium percarbonate, sodium peroxide, strontium nitrate, strontium peroxide, tellurium trioxide, tin nitrate, and zinc peroxide.

* * * * *